United States Patent
Olad Gharehgoz et al.

(10) Patent No.: US 10,100,169 B2
(45) Date of Patent: Oct. 16, 2018

(54) METHOD FOR PREPARATION OF POLYANILINE NANOSTRUCTURES

(71) Applicants: Ali Olad Gharehgoz, Tabriz (IR); Rahimeh Nosrati, Tabriz (IR)

(72) Inventors: Ali Olad Gharehgoz, Tabriz (IR); Rahimeh Nosrati, Tabriz (IR)

(*) Notice: Subject to any disclaimer, the term of this patent is extended or adjusted under 35 U.S.C. 154(b) by 0 days.

(21) Appl. No.: 15/256,500

(22) Filed: Sep. 2, 2016

(65) Prior Publication Data

US 2016/0369082 A1 Dec. 22, 2016

Related U.S. Application Data

(60) Provisional application No. 62/217,880, filed on Sep. 12, 2015.

(51) Int. Cl.
*B05D 7/00* (2006.01)
*C08K 3/16* (2006.01)
*C08G 73/02* (2006.01)

(52) U.S. Cl.
CPC .......... *C08K 3/16* (2013.01); *C08G 73/0266* (2013.01)

(58) Field of Classification Search
CPC ................................. C08K 3/00; C08G 73/00
See application file for complete search history.

(56) References Cited

U.S. PATENT DOCUMENTS 5,507,977 A * 4/1996 Virtanen ............... H01B 1/128
 252/500
8,507,415 B2 8/2013 Waynick

FOREIGN PATENT DOCUMENTS

CN 103555221 A * 2/2014

OTHER PUBLICATIONS

"Preparation and corrosion resistance of nanostructured PVC/ZnO-polyaniline hybrid coating", Ali Olad, Rahimeh Nosrati, Progress in Organic Coatings, 76 (2013), 113-118.*
"Self-assembled polyaniline micro/nanotubes doped with hydrofluoric acid", Deng Junying, Zhang Zhiming, Yu Liangmin, Wan Meixiang, Acta Polymerica Sinica, 2007, 1, Issue (3): 277-281.*
"Synthesis and electrochemical properties of various dimensional polyaniline micro/nanostructures: Microdisks, nanospheres and nanofibers", Haosen Fan, Hao Wang, Xiaolan Yu, Ning Zhao, Xiaoli Zhang, Jian Xu, Materials Letters, vol. 71, Mar. 15, 2012, pp. 70-73.*
"ZnO assisted polyaniline nanofibers and its application as ammonia gas sensor", Vivek Talwar, Onkar Singh, Ravi Chand Singh, Sensors and Actuators B 191 (2014) 276-282.*
CN103014871B, English Translated, 2013.*
CN 103555221A—Google Patents, 2014.*

(Continued)

*Primary Examiner* — David P Turocy
*Assistant Examiner* — Mohammad Mayy
(74) *Attorney, Agent, or Firm* — NovoTechIP International PLLC

(57) ABSTRACT

Aniline monomers are subjected to a chemical oxidative polymerization in the presence of a templating compound and a primary dopant to obtain polyaniline nanostructures with a first morphology. The obtained polyaniline nanostructures are doped with a secondary dopant to obtain polyaniline nanostructures with a second morphology.

7 Claims, 26 Drawing Sheets

(56) References Cited

OTHER PUBLICATIONS

Haosen Fan, Synthesis and electrochemical properties of various dimensional polyaniline micro/nanostructures: Microdisks, nanospheres and nanofibers, Materials Letters, Mar. 15, 2012, vol. 71, pp. 70-73.

Vivek Talwar, ZnO assisted polyaniline nanofibers and its application as ammonia gas sensor, Sensors and Actuators B: Chemical, Feb. 2014, vol. 191, pp. 276-282.

Li Guo, A Facile Approach to Increase Conductivity of Polyaniline Nanofibers, Advanced Materials Research, Feb. 10, 2012, vol. 466, pp. 88-92.

Shixiang Zuo, Preparation of polyaniline-polypyrrole binary composite nanotube using halloysite as hard-template and its characterization, Chemical Engineering Journal, Jul. 15, 2013, vol. 228, pp. 1092-1097.

Deng Junying, Self-assembled polyaniline micro/nanotubes doped with hydrofluoric acid, Acta Polymerica Sinica, Mar. 1, 2007, vol. 1, Issue 3, pp. 277-281.

\* cited by examiner

METHOD FOR PREPARATION OF POLYANILINE NANOSTRUCTURES

CROSS REFERENCE TO RELATED APPLICATION

This application claims the benefit of priority from U.S. Provisional Patent Application Ser. No. 62/217,880, filed on Sep. 12, 2015, and entitled "Acid Treatment for the Preparation of Various Polyaniline Nanostructures," which is incorporated by reference herein in its entirety.

TECHNICAL FIELD

The present application generally relates to polyaniline nanostructures, and particularly to synthesis of polyaniline nanostructures, and more particularly to post-synthesis morphological change of polyaniline nanostructures.

BACKGROUND

Conducting polymers, polyaniline (PANI) among them, alone or mixed with conventional polymers, have been successfully applied in batteries, sensors, electro-chromic devices, capacitors, solar cells, corrosion inhibitors, light emitting diodes, metallization, coating for metallic surfaces, etc.

PANI exists in three different forms: leucoemeraldine base (LEB, fully reduced form), emeraldine base (EB, partially oxidized form) and pemigraniline base (PNB, fully oxidized form). Among the different oxidation states of PANI, the emeraldine salt (ES) is the only one that presents electrical conductivity. Nevertheless, the emeraldine base (EB) can be converted to emeraldine salt (ES), and vice-versa, by protonation/de-protonation with acid/base.

PANI nanostructures include nanowires, nano-rods, nanotubes, nanofibers, nano-belts, and nano-ribbons and they can possess advantageous properties, such as high surface areas, good environmental stability and potential applications in molecular wires, chemical sensors, biosensors and artificial muscles. To date, a variety of synthetic approaches, such as seeding polymerization, electrochemical method, interfacial polymerization, hard-template method, soft-template method, and template-free method, have been used for fabrication of PANI micro/nanostructures. There is remaining need in the art, though, for simpler methods and processes for preparing PANI nanostructures, and for improved methods and processes for post-synthesis change of morphology of PANI nanostructures.

SUMMARY

In one general aspect, methods described herein include a method for synthesizing polyaniline nanostructures, and exemplary operations in the method can include: subjecting aniline monomers to a chemical oxidative polymerization in the presence of a templating compound and a primary dopant to obtain polyaniline nanostructures with a first morphology; and then, doping the obtained polyaniline nanostructures with a secondary dopant to obtain polyaniline nanostructures with a second morphology.

Methods for synthesizing polyaniline nanostructures according to one general aspect include one of the following features. The chemical oxidative polymerization can include steps of: first, preparing an aniline hydrochloride solution; second, mixing the templating compound with the aniline hydrochloride solution to obtain a first mixture; and finally, adding a solution containing an oxidant and the primary dopant to the first mixture to obtain a second mixture and leaving the second mixture for the chemical oxidative polymerization to occur during a polymerization period. The aniline hydrochloride solution can be prepared by dissolving aniline in an aqueous solution of HCl.

According to an implementation, doping the obtained polyaniline nanostructures with a secondary dopant can include dispersing the obtained polyaniline nanostructures in a solution of the secondary dopant.

According to an implementation, the oxidant can include APS, $H_2O_2$, $KMnO_4$, $K_2Cr_2O_7$, $FeCl_3$ and $KIO_3$. The oxidant can have a concentration between 0.25 M and about 3 M.

According to another implementation, the primary dopant can be for example HCl, $H_2SO_4$, $HNO_3$, $H_2C_2O_4$, $HClO_4$, $HClO_3$, $H_3PO_4$, HF, HI, HBr, citric acid, salicylic acid, sulfonic acids, carboxylic acids, or mixtures thereof. The primary dopant can have a concentration between about 0.05 M and about 2.5 M.

According to yet another implementation, the templating compound can be a soft templating compound, a hard templating compound, or mixtures thereof. The templating compound can be polyvinylpyrrolidone (PVP) adsorbed on the surface of ZnO nanoparticles. In an implementation, the templating compound can be ZnO nanoparticles. In another implementation, the templating compound can be PVP.

According to some implementations, the secondary dopant can include, for example HF, HCl, $H_2SO_4$, $HNO_3$, $H_2C_2O_4$, $HClO_4$, $HClO_3$, $H_3PO_4$, HF, HI, HBr, citric acid, salicylic acid, sulfonic acids, carboxylic acids, or mixtures thereof. The secondary dopant can a concentration between about 0.0001 M and about 1M.

DETAILED DESCRIPTION

The present disclosure describes a method for synthesizing polyaniline nanostructures with various morphologies. Processes according to the method can involve oxidative polymerization of aniline monomers in the presence of a templating compound and a primary dopant to obtain polyaniline nanostructures and then changing morphology of the polyaniline nanostructures by doping the polyaniline nanostructures with a secondary dopant. Benefits of this method can include, but not limited to an easy synthesis of polyaniline nanostructures with different morphologies without the need to repeat the synthesis procedure. Once a first morphology of the polyaniline nanostructure is synthesized, a second morphology could be easily achieved by a secondary doping of the synthesized polyaniline nanostructure (i.e., a post-synthesis doping). The second morphology can include, for example, nanoparticles, nanowires, nano-rods, nanotubes, nanofibers, nano-belts, nanoplates and nanoribbons.

Figure 1:
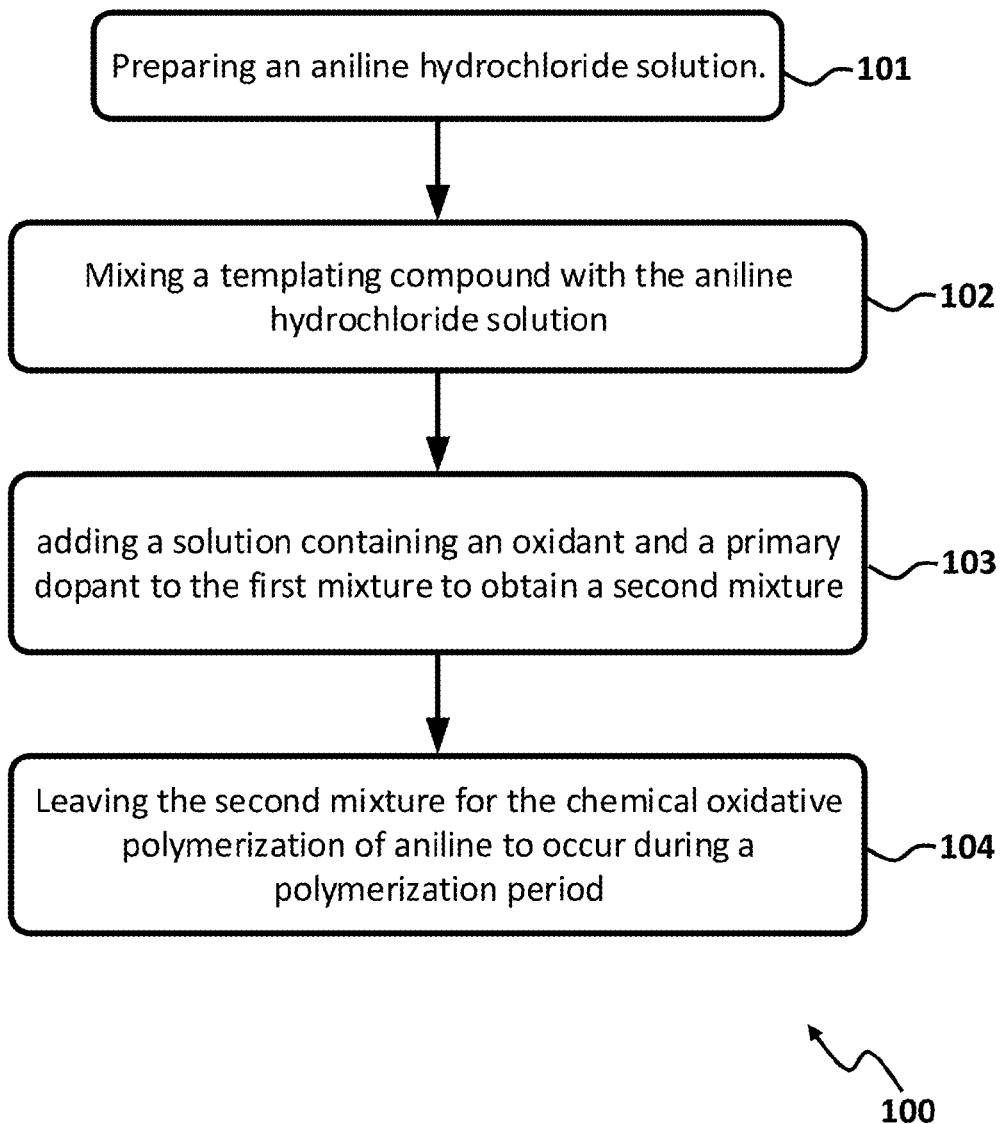
FIG. 1 illustrates an example process in one synthesis method for polyaniline nanostructures, pursuant to the teachings of the present disclosure.

FIG. 1 illustrates an example synthesis method 100 for polyaniline nanostructures according to an aspect of the present disclosure. Operations according to the method 100 can include: preparing an aniline hydrochloride solution (step 101); mixing a templating compound with the aniline hydrochloride solution to obtain a first mixture (step 102); then, adding a solution containing an oxidant and a primary dopant to the first mixture to obtain a second mixture (step 103); and finally, leaving the second mixture for the chemical oxidative polymerization of aniline to occur during a polymerization period (step 104).

Referring to step 101, in an implementation, the aniline hydrochloride solution can be prepared by dissolving aniline, for example distilled aniline in an aqueous solution of hydrochloric acid (HCl).

Moving on to step 102, a templating compound can be mixed with the aniline hydrochloride solution. The templating compound can be a soft templating compound, for example, a surfactant, a polyelectrolyte or a polymer; a hard templating compound, such as zinc oxide (ZnO) nanoparticles; or a combination of soft templating compounds and hard templating compounds.

According to an implementation, the templating compound can be prepared by dispersing a hard templating compound, such as ZnO nanoparticles in an alcohol solution, for example, an ethanol solution. The dispersion can be carried out under, for example, an ultrasonic agitation. During the ultrasonic agitation, a soft templating compound, such as polyvinylpyrrolidone (PVP) can be added to the dispersion. The resultant mixture can be left for a period of time, for example 24 hours for PVP to be precipitated from the mixture and be adsorbed on the surface of ZnO nanoparticles and then the precipitated product can be dispersed in distilled water followed by centrifugation to obtain the templating compound. Here, the obtained templating compound is PVP adsorbed on the surface of ZnO nanoparticles.

According to some implementations, the templating compound can include a hard templating compound, such as ZnO nanoparticles dispersed in an alcohol solution, for example, an ethanol solution. The dispersion can be carried out under, for example, an ultrasonic agitation.

According to other implementations, the templating compound can include a soft templating compound, such as PVP. PVP is a water soluble polymer as well as a polymeric non-ionic surfactant with a long and soft polyvinyl backbone and acyl amino side groups.

Moving on to step 103, a solution containing an oxidant and a primary dopant can be added, for example in a drop wise manner to the mixture of the templating compound and aniline hydrochloride, obtained in step 102, under continuous stirring to obtain a second mixture. The oxidant is used herein for oxidizing the aniline hydrochloride solution and it can have a concentration range of, for example, between 0.25 M and 3 M. According to an implementation, the oxidant can be selected form the group consisting of ammonium persulfate (APS), $H_2O_2$, $KMnO_4$, $K_2Cr_2O_7$, $FeCl_3$, $KIO_3$, and mixtures thereof.

According to an implementation, the primary dopant can be an aqueous solution of an acid, for example, HCl, $H_2SO_4$, $HNO_3$, $H_2C_2O_4$, $HClO_4$, $HClO_3$, $H_3PO_4$, HF, HI, HBr, citric acid, salicylic acid, sulfonic acids, carboxylic acids, or mixtures thereof. The aqueous solution of the primary dopant can have a concentration range of about 0.0001 M to about 1 M.

Moving on to step 104, the second mixture can be left for a polymerization period, during which the oxidative polymerization of aniline can proceed and polyaniline nanostructures can be obtained. In some implementations, the polymerization period can be about 2 to about 24 hours. In one implementation, the polymerization period can be 5 hours. According to some implementations, the polymerization can be carried out at room temperature. According to other implementations, the polymerization can be carried out in a temperature range of about −5° C. to about room temperature.

Referring to FIG. 1, utilizing synthesis method 100, polyaniline nanostructures can be obtained with a first morphology. Depending on particular applications, different morphologies of polyaniline nanostructures must be synthesized. According to an aspect, once polyaniline nanostructures with the first morphology are synthesized, the first morphology can be changed into a second morphology using a secondary doping with an acid solution (i.e., secondary dopant). Therefore, in another step (not shown in FIG. 1), polyaniline nanostructures with the first morphology can be dispersed in the secondary dopant, for example, a hydrofluoric acid (HF) solution with a concentration range of 0.0001M to 1M to obtain polyaniline nanostructures with a second morphology.

According to some implementations, the secondary dopant can be an aqueous solution of an acid, for example, HCl, $H_2SO_4$, $HNO_3$, $H_2C_2O_4$, $HClO_4$, $HClO_3$, $H_3PO_4$, HF, HI, HBr, sulfonic acids, citric acid, salicylic acid, carboxylic acids or mixtures thereof with a concentration between, for example, 0.0001M and 1M.

EXAMPLES

Example 1: Synthesis of ZP-PANI Nanostructures

In this example, polyaniline nanostructures are synthesized by oxidizing aniline hydrochloride with ammonium persulfate (APS) as an oxidant with the oxidant to monomer molar ratio of (1:1) in the presence of aqueous HCl solution as a primary dopant. In this example, polyvinylpyrrolidone (PVP) adsorbed on the surface of ZnO nanoparticles is used as a templating compound.

ZPA-PANI

First, 0.25 g of ZnO nanoparticles are dispersed in 25 mL of ethanol solution to obtain a dispersion, and 0.63 g of polyvinylpyrrolidone (PVP) can be mixed with the dispersion under agitation. The resultant mixture can be left for 24 hours for PVP to be precipitated from the mixture and be adsorbed on the surface of the ZnO nanoparticles. The precipitated product can be dispersed in distilled water and be centrifuged to obtain the templating compound. The templating compound can be added to 6.30 ml of an aniline hydrochloride solution obtained by mixing 0.14 mL of distilled aniline in an aqueous solution of HCl with a concentration of 0.37 M. Then, 6.16 mL of a mixture of 0.35 g of ammonium persulfate (APS) and HCl solution with a concentration of 0.38 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled, for purposes of description, as ZPA-PANI.

ZPB-PANI

First, 0.25 g of ZnO nanoparticles are dispersed in 25 mL of ethanol solution to obtain a dispersion and 0.63 g of polyvinylpyrrolidone (PVP) can be mixed with the dispersion under agitation. The resultant mixture can be left for a 24 hours for PVP to be precipitated from the mixture and be adsorbed on the surface of the ZnO nanoparticles. The precipitated product can be dispersed in distilled water and be centrifuged to obtain the templating compound. The templating compound can be added to 5.51 ml of an aniline hydrochloride solution obtained by mixing 0.14 mL of distilled aniline in an aqueous solution of HCl with a concentration of 0.13 M. Then, 5.37 mL of a mixture of 0.35 g of ammonium persulfate (APS) and HCl solution with a concentration of 0.14 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled, for purposes of description, as ZPB-PANI.

ZPC-PANI

First, 0.25 g of ZnO nanoparticles are dispersed in 25 mL of ethanol solution to obtain a dispersion and 0.63 g of polyvinylpyrrolidone (PVP) can be mixed with the dispersion under agitation. The resultant mixture can be left for a 24 hours for PVP to be precipitated from the mixture and be adsorbed on the surface of the ZnO nanoparticles. The precipitated product can be dispersed in distilled water and be centrifuged to obtain the templating compound. The templating compound can be added to 5.33 ml of an aniline hydrochloride solution obtained by mixing 0.14 mL of distilled aniline in an aqueous solution of HCl with a concentration of 0.07 M. Then, 5.19 mL of a mixture of 0.35 g of ammonium persulfate (APS) and HCl solution with a concentration of 0.07 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled, for purpose of description, as ZPC-PANI.

Example 2: Synthesis of Z-PANI Nanostructures

In this example, polyaniline nanostructures are synthesized by oxidizing aniline hydrochloride with ammonium persulfate (APS) as an oxidant with the oxidant to monomer molar ratio of (1:1) in the presence of aqueous HCl solution as a primary dopant. In this example, ZnO nanoparticles are used as a hard templating compound.

ZA-PANI

First, 0.25 g of ZnO nanoparticles as the templating compound can be added to 6.30 ml of an aniline hydrochloride solution obtained by mixing 0.14 mL of distilled aniline and an aqueous solution HCl with a concentration of 0.37 M. Then, 6.16 mL of a mixture of 0.35 g of ammonium persulfate (APS) and HCl solution with a concentration of 0.38 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled, for purposes of description, as ZA-PANI.

ZB-PANI

First, 0.25 g of ZnO nanoparticles as the templating compound can be added to 5.51 ml of an aniline hydrochloride solution obtained by mixing 0.14 mL of distilled aniline and an aqueous solution of HCl with a concentration of 0.13 M. Then, 5.37 mL of a mixture of 0.35 g of ammonium persulfate (APS) and HCl solution with a concentration of 0.14 M can be added drop-wise into the aniline hydrochloride solution, under continuous stirring for 5 hours at ambient temperature, for polymerization of aniline to occur. The obtained polyaniline can be rinsed and dried to obtain a polyaniline nanostructure that is labeled, for purposes of description, as ZB-PANI.

ZC-PANI

First, 0.25 g of ZnO nanoparticles as the templating compound can be added to 5.33 ml of an aniline hydrochloride solution obtained by mixing 0.14 mL of distilled aniline and an aqueous solution HCl with a concentration of 0.07 M. Then, 5.19 mL of a mixture of 0.35 g of ammonium persulfate (APS) and HCl solution with a concentration of 0.07 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled as ZC-PANI.

Example 3: Synthesis of P-PANI Nanostructures

In this example, polyaniline nanostructures are synthesized by oxidizing aniline hydrochloride with ammonium persulfate (APS) as an oxidant with the oxidant to monomer molar ratio of (1:1) in the presence of aqueous HCl solution as a primary dopant. In this example, PVP is used as a soft templating compound.

PA-PANI

Here, 0.63 g of PVP as the templating compound can be added to 6.30 ml of an aniline hydrochloride solution obtained by mixing 0.14 mL of distilled aniline with an aqueous HCl solution with a concentration of 0.37 M. Then, 6.16 mL of a mixture of 0.35 g of ammonium persulfate (APS) and HCl solution with a concentration of 0.38 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled as PA-PANI.

PB-PANI

Here, 0.63 g of PVP as the templating compound can be added to 5.51 ml of an aniline hydrochloride solution obtained by mixing 0.14 mL of distilled aniline with an aqueous HCl solution with a concentration of 0.13 M. Then, 5.37 mL of a mixture of 0.35 g of ammonium persulfate (APS) and HCl solution with a concentration of 0.14 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled as PB-PANI.

PC-PANI

Here, 0.63 g of PVP as the templating compound can be added to 5.33 ml of an aniline hydrochloride solution obtained by mixing 0.14 mL of distilled aniline with an aqueous HCl solution with a concentration of 0.07 M. Then, 5.19 mL of a mixture of 0.35 g of ammonium persulfate (APS) and HCl solution with a concentration of 0.07 M can be added, drop-wise, into the aniline hydrochloride solution, under continuous stirring for 5 hours at ambient temperature, for polymerization of aniline to occur. The obtained polyaniline can be rinsed and dried to obtain a polyaniline nanostructure that is labeled as PC-PANI.

Example 4: Synthesis of PANI Nanostructures

In this example, polyaniline nanostructures are synthesized by oxidizing aniline hydrochloride with ammonium persulfate (APS) as an oxidant with the oxidant to monomer molar ratio of (1:1) in the presence of aqueous HCl solution as a primary dopant. In this example, a templating compound is not used in the synthesis process.

A-PANI

Here, 6.16 mL of a mixture of 0.35 g of ammonium persulfate (APS) and HCl solution with a concentration of 0.38 M can be added drop-wise into a 6.30 ml of an aqueous HCl solution with a concentration of 0.37 M, containing 0.14 mL of distilled aniline under continuous stirring for 5 hours at ambient temperature for polymerization of aniline to occur. The obtained polyaniline can be rinsed and dried to obtain a polyaniline nanostructure that is labeled as A-PANI.

B-PANI

Here, 5.37 mL of a mixture of 0.35 g of ammonium persulfate (APS) and HCl solution with a concentration of 0.14 M can be added, drop-wise, into a 5.51 ml of an aqueous HCl solution with a concentration of 0.13 M, containing 0.14 mL of distilled aniline, under continuous stirring for 5 hours at ambient temperature, for polymerization of aniline to occur. The obtained polyaniline can be rinsed and dried to obtain a polyaniline nanostructure that is labeled as B-PANI.

C-PANI

Here, 5.19 mL of a mixture of 0.35 g of ammonium persulfate (APS) and HCl solution with a concentration of 0.07 M can be added, drop-wise, into a 5.33 ml of an aqueous HCl solution with a concentration of 0.07 M, containing 0.14 mL of distilled aniline, under continuous stirring for 5 hours at ambient temperature, for polymerization of aniline to occur. The obtained polyaniline can be rinsed and dried to obtain a polyaniline nanostructure that can be labeled, for example, as C-PANI.

Example 5: Secondary Doping

The as-prepared polyaniline nanostructures synthesized according to methods described in examples 1-4 are then dispersed in a 10% (w/w) aqueous solution of hydrofluoric acid (HF) as a secondary dopant. The dispersions can be left, for example, for 24 hours. Then HF can be dried and protonated polyaniline nanostructures are obtained. In the products codes, the letter "Z" refers to the use of ZnO nanoparticles, the letter "P" refers to the use of PVP, letters "A", "B" and "C" show the various concentrations of hydrochloric acid, which is used in the synthesis of polyaniline from high to low concentrations, respectively. Also, the letter "H" means that the synthesized PANI has been protonated in an acid solution after synthesis.

Example 6: FT-IR Characterization

In this example, Fourier transform infrared (FT-IR) spectra of polyaniline samples synthesized as described in connection with example 1 and their protonated counterpart synthesized as described in connection with example 5, are utilized for confirming a successful synthesis of polyaniline nanostructures and discussing structural characterizations of synthesized polyaniline nanostructures.

Figure 2:
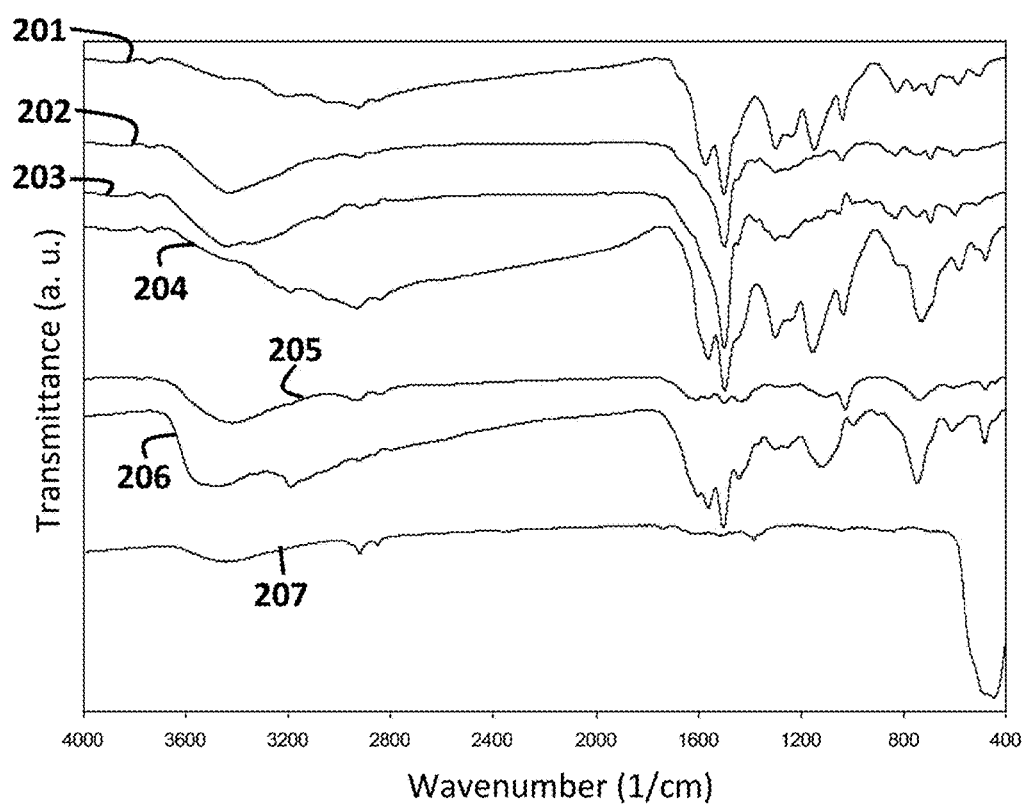
FIG. 2 illustrates Fourier transform infrared (FT-IR) spectra of polyaniline nanostructures, synthesized as described in connection with examples 1 and 5; and FT-IR spectrum of ZnO nanoparticles.

FIG. 2 illustrates FT-IR spectra of ZPA-PANI 201, ZPB-PANI 202, ZPC-PANI 203, ZPAH-PANI 204, ZPBH-PANI 205, ZPCH-PANI 206, and FT-IR spectrum of ZnO nanoparticles 207. Referring to FIG. 2, the absorption peak in the wavenumber of 1490 cm−1 is related to the stretching vibrations of C═C bands of benzoid and the absorption peak in the wavenumber of 1560 cm−1 is related to the stretching vibrations of C═C bands of quinoid rings in polyaniline. The intensity of these peaks can indicate the oxidation state of polyaniline. Referring to FIG. 2, for example, in the spectrum of ZPA-PANI 201, the intensity of peak related to the benzoid C═C stretching mode is higher than that of quinoid C═C stretching mode. This can mean, without intending to be bound by any particular theory, that the number of benzoid rings in ZPA-PANI structure is more than quinoid rings. The absorption peak at 1290 cm−1 wavenumber corresponds to the stretching vibration mode of C—N bond related to the secondary amine group in polyaniline. The broad peak at 2900 cm−1 is due to the stretching mode of N—H bond of secondary aromatic amines in polyaniline samples.

ZPB-PANI and ZPC-PANI samples are synthesized using lower concentrations of hydrochloric acid during synthesis. Referring to FIG. 2, in the spectra of ZPB-PANI 202 and ZPC-PANI 203, the absorption peak of stretching vibration mode of C═C band of benzoid rings (1490 cm−1) can be seen. However, the absorption peak related to the stretching vibration of C═C band of quinoid rings is very weak and appears only as a shoulder near the peak related to the benzoid rings. The inventors believe, therefore, without intending to be bound by any particular theory, that when the concentration of acid during the synthesis is reduced, the number of benzoid rings in polyaniline chain is increased compared to that of the quinoid rings, and the benzoid oxidative state is dominant. Moreover, in the spectra of ZPB-PANI 202 and ZPC-PANI 203, the absorption peak related to the stretching vibration mode of C—N bond of secondary amine groups in polyaniline chain (1290 cm$^{-1}$) also appears, as is shown in FIG. 1. However, the broad peak related to the stretching mode of N—H bonds of secondary aromatic amines are shifted to the higher wave numbers at about 3400 cm$^{-1}$, as is observed in spectra 202 and 203.

Referring to FIG. 2, FT-IR spectrum of ZPAH-PANI 204 is similar to that of ZPA-PANI 201 and only an additional peak appears at 720 cm$^{-1}$, which can be due to the interactions between Fluorine atoms and PANI chains. However, as observed in the FT-IR spectra of ZPBH-PANI 205 and ZPCH-PANI 206 compared to the FT-IR spectra of ZPB-PANI 202 and ZPC-PANI 203, the intensity of absorption peaks related to the stretching vibration of C=C quinoid rings increases in the spectra of ZPBH-PANI 205 and ZPCH-PANI 206. Therefore, without intending to be bound by any particular theory, the inventors believe that the post-synthesis doping and the doping during polymerization can change some of the benzoid rings to the quinoid rings and can lead to similar numbers of benzoid and quinoid rings in the protonated samples (i.e., ZPAH-PANI, ZPBH-PANI, and ZPCH-PANI). Moreover, the additional peak at 720 cm$^{-1}$ appears in spectra 205 and 206, and this can be due to the interactions between Fluorine atoms and PANI chains. Referring to FIG. 2, in the FT-IR spectrum of ZnO nanoparticles 207, a strong peak appears at 490 cm$^{-1}$. This can be attributed to the stretching vibration of Zn—O bond. Referring to the spectra 201, 202, and 203, there is no peak at the wave numbers lower than 500 cm$^{-1}$. This indicates there is no ZnO in the synthesized polyaniline samples (i.e., ZPA-PANI, ZPB-PANI, and ZPC-PANI). Without intending to be bound by any particular theory, this can be due to the degradation and dissolution of zinc oxide nanoparticles in the acidic condition during the synthesis of polyaniline chains. Therefore, it can be that the samples synthesized as was described in connection with example 1, are pure polyaniline.

Example 7: FE-SEM Characterization

In this example, field emission scanning electron microscope (FE-SEM) images of polyaniline samples synthesized as described in connection with examples 1-5 are utilized to characterize morphologies of polyaniline nanostructures.

Figure 3A:
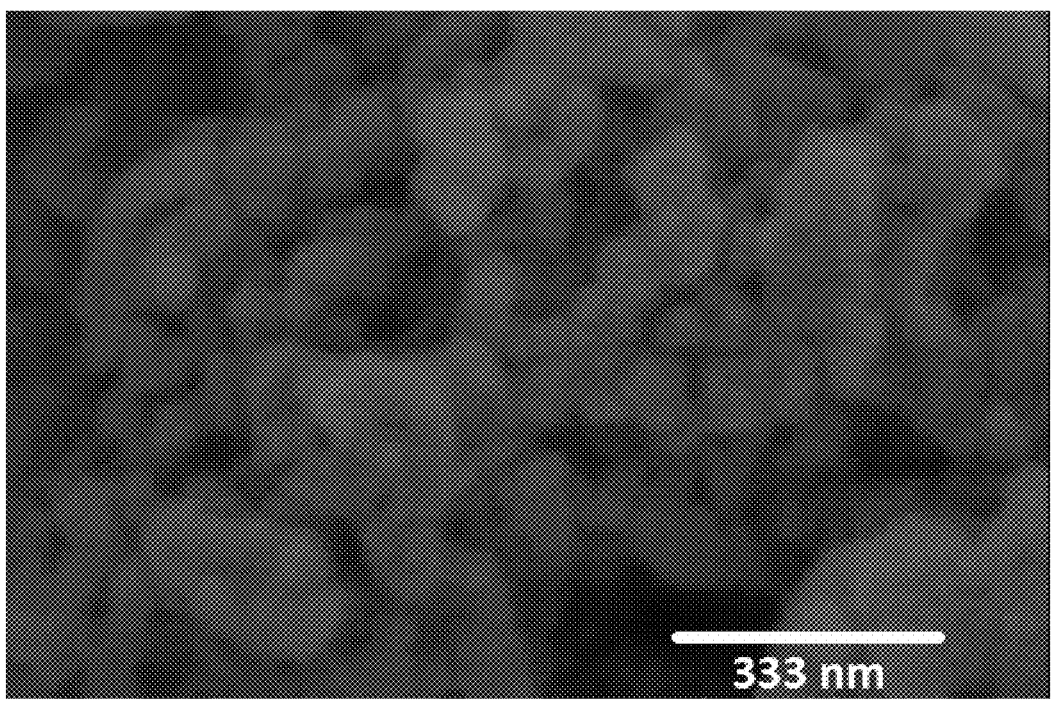
FIGS. 3A-3C are field emission scanning electron microscope (FE-SEM) micrographs of polyaniline nanostructures prepared as described in connection with example 1: ZPA-PANI (FIG. 3A); ZPB-PANI (FIG. 3B); and ZPC-PANI (FIG. 3C).
Figure 3B:
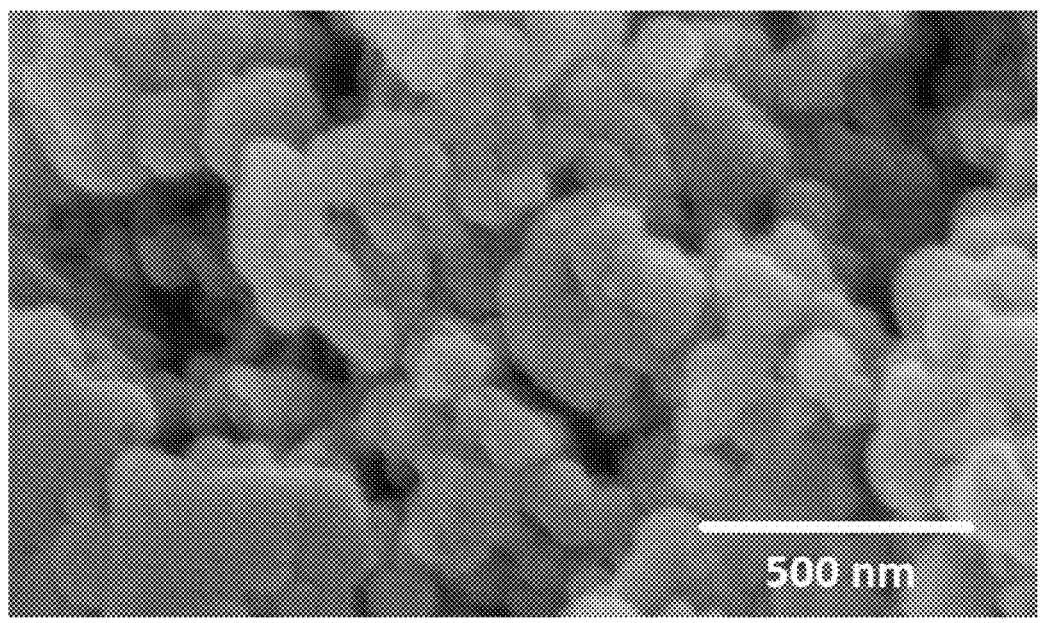
Figure 3C:
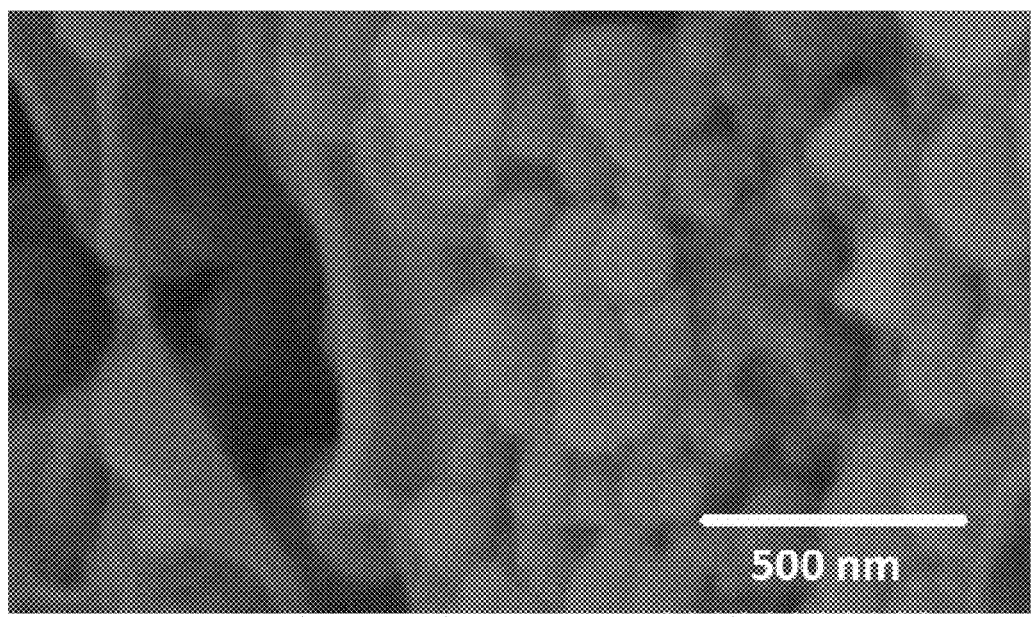

FIGS. 3A-3C are FE-SEM micrographs of polyaniline nanostructures prepared as described in connection with example 1. FIG. 3A is an FE-SEM micrograph of ZPA-PANI, FIG. 3B is an FE-SEM micrograph of ZPB-PANI, and FIG. 3C is an FE-SEM micrograph of ZPC-PANI.

Referring to FIGS. 3A-3C, the size of nanoparticles increases with decreasing the concentration of the primary dopant acid. Referring to FIG. 3C, for example, in the ZPC-PANI, tubular plates of polymers are formed.

Figure 4A:
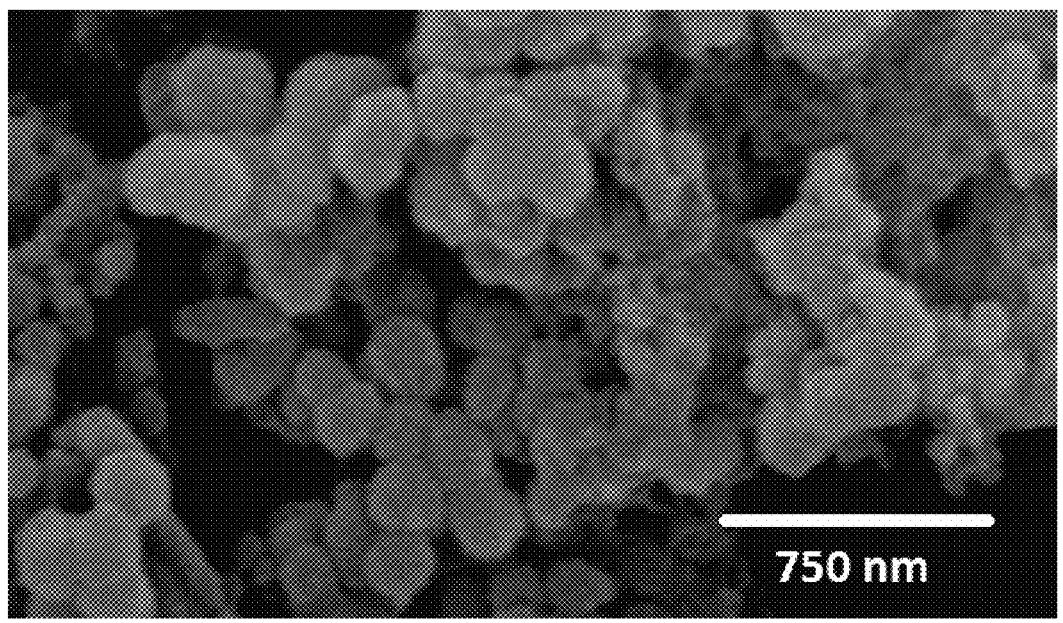
FIGS. 4A-4C are field emission scanning electron microscope (FE-SEM) micrographs of protonated polyaniline nanostructures of example 1, prepared as described in connection with example 5: ZPAH-PANI (FIG. 4A); ZPBH-PANI (FIG. 4B); and ZPCH-PANI (FIG. 4C).
Figure 4B:
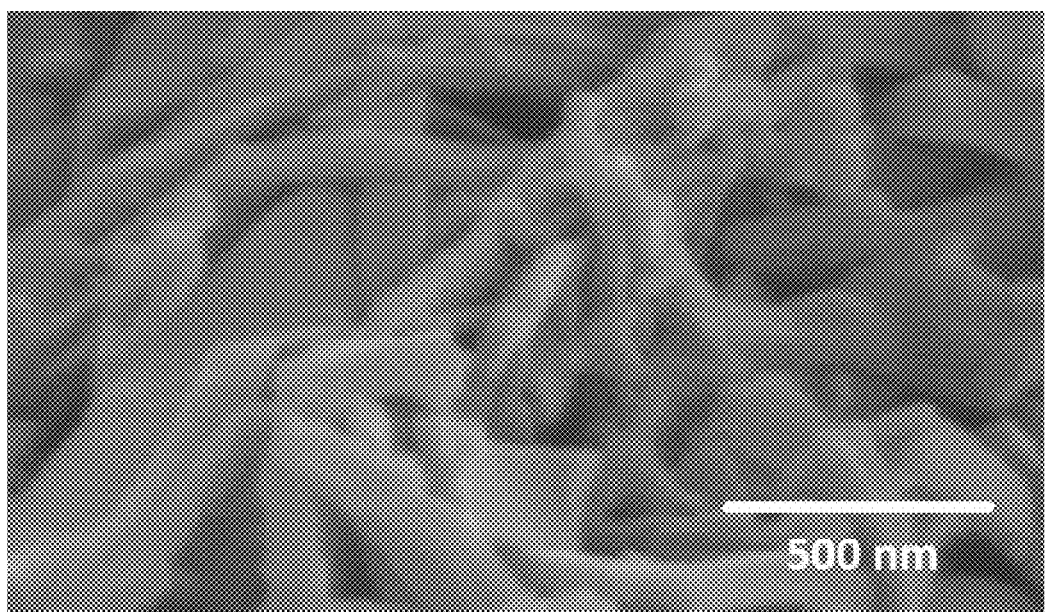
Figure 4C:
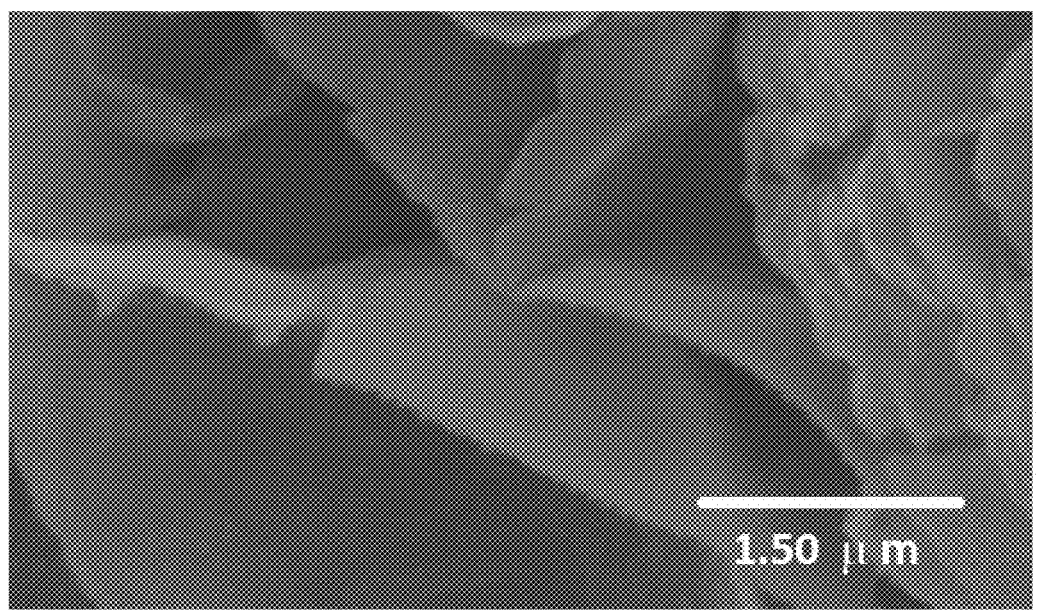

FIGS. 4A-4C are FE-SEM micrographs of polyaniline nanostructures prepared as described in connection with example 5. FIG. 4A is an FE-SEM micrograph of ZPAH-PANI, FIG. 4B is an FE-SEM micrograph of ZPBH-PANI, and FIG. 4C is an FE-SEM micrograph of ZPCH-PANI.

Referring to FIGS. 4A-4C, polyaniline nanoparticles were obtained in ZPAH-PANI sample (visible in FIG. 4A); nano-belt structure was obtained in ZPBH-PANI sample (visible in FIG. 4B); and conjunct nano-plates were obtained in ZPCH-PANI sample (visible in FIG. 4C).

Referring to FIG. 3A, the particle size of ZPA-PANI sample is about 40 nm, however, once this sample is doped by hydrofluoric acid, the accumulation of nanoparticles, leads to an increase in the size of particles to about 200 nm (as can be measured from FIG. 4A).

In the case of ZPB-PANI, the nanoparticles are completely reformed to nano-belt structure with mean thickness of 80 nm after the secondary doping (as shown in FIG. 4B) and in case of ZPC-PANI samples, the nanoparticles are completely reformed to conjunct nameplates with the mean thickness of 70 nm respectively after secondary doping (as shown in FIG. 4C).

Fluorine dopant ions can cause the structural reformation of nanoparticles to two and three-dimensional arrays, depending on the extent of doping ions insertion into the polymer structure. In other words, and without intending to be bound by any particular theory, it can be stated that the primary HCl doping level during the synthesis determines the extent of post-synthesis dopant ion insertion to the polymer structure backbone, which determines the reformed structure after secondary doping.

Considering the similar conditions utilized in the secondary HF doping, it can be stated, without intending to be bound by any particular theory, that the application of different primary synthesis conditions (different concentrations of HCl as the primary dopant) followed by a secondary doping, results in completely different nanostructures. However, due to the use of ZnO nanoparticles and PVP during the synthesis of polyaniline, their role has also been investigated. To this end, polyaniline samples were similarly synthesized without using ZnO nanoparticles and/or PVP (as described in examples 2-4), and were similarly doped after synthesis by HF solution (as described in example 5).

Figure 5A:
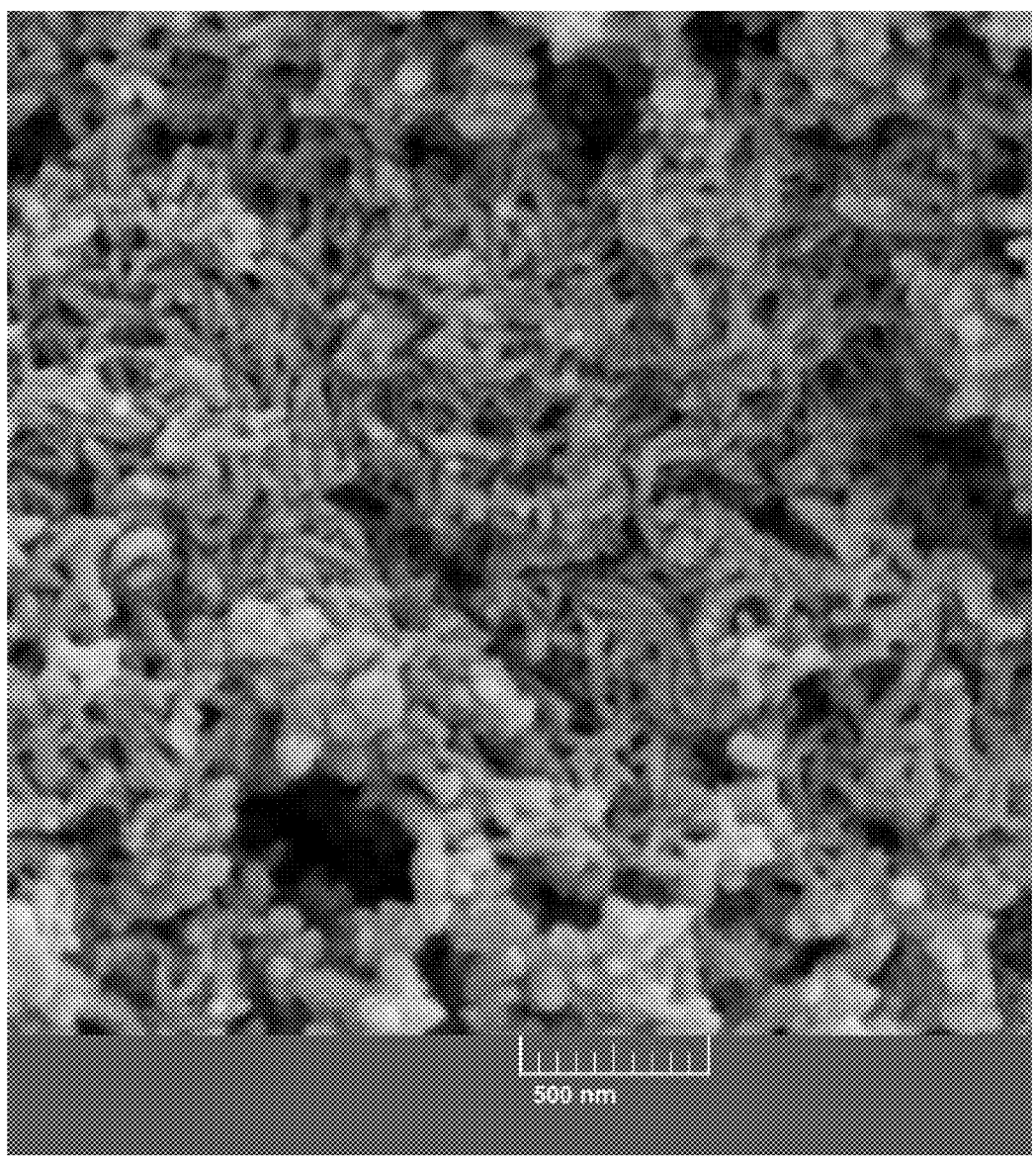
FIGS. 5A-5C are field emission scanning electron microscope (FE-SEM) micrographs of polyaniline nanostructures prepared as described in connection with example 4: A-PANI (FIG. 5A); B-PANI (FIG. 5B); and C-PANI (FIG. 5C).
Figure 5B:
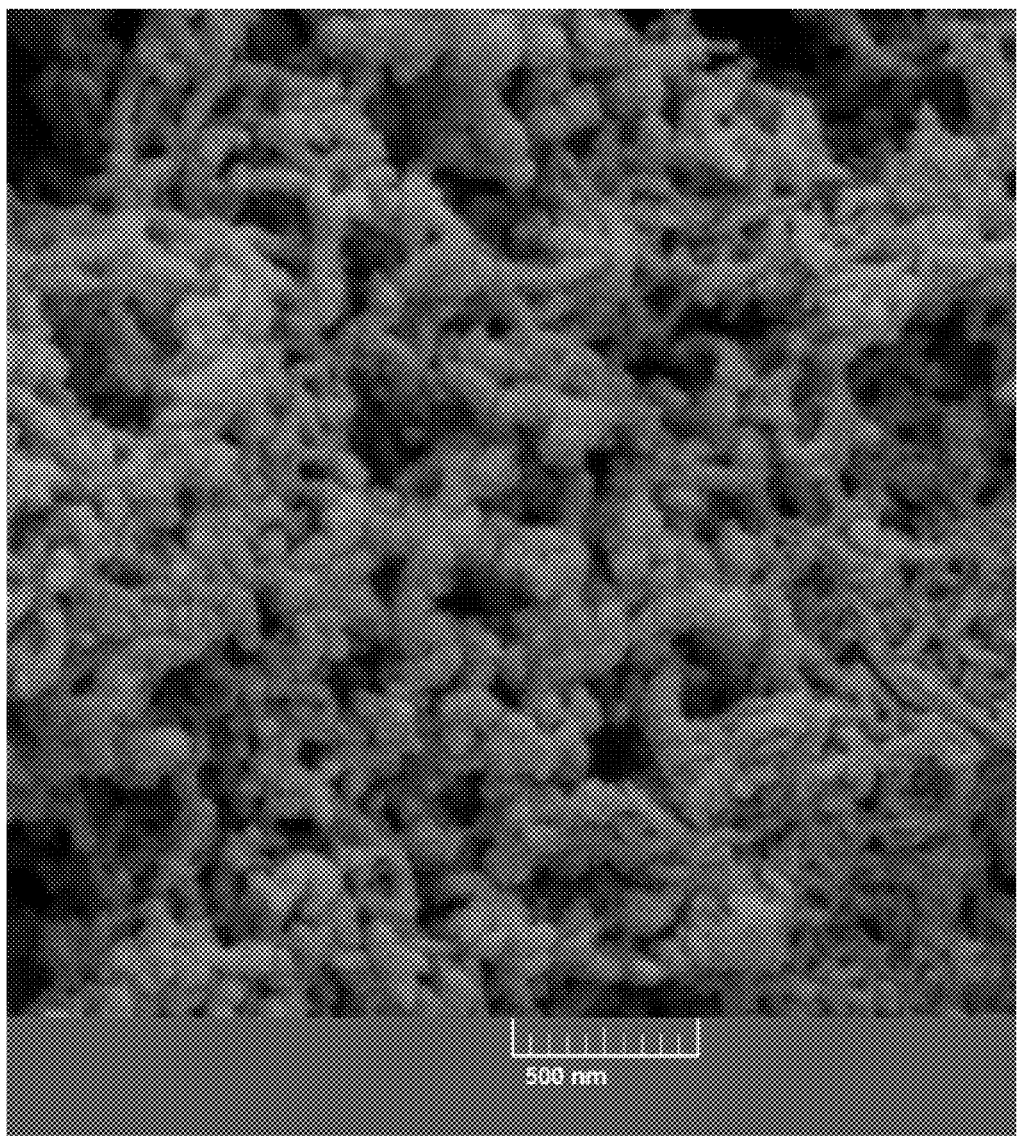
Figure 5C:
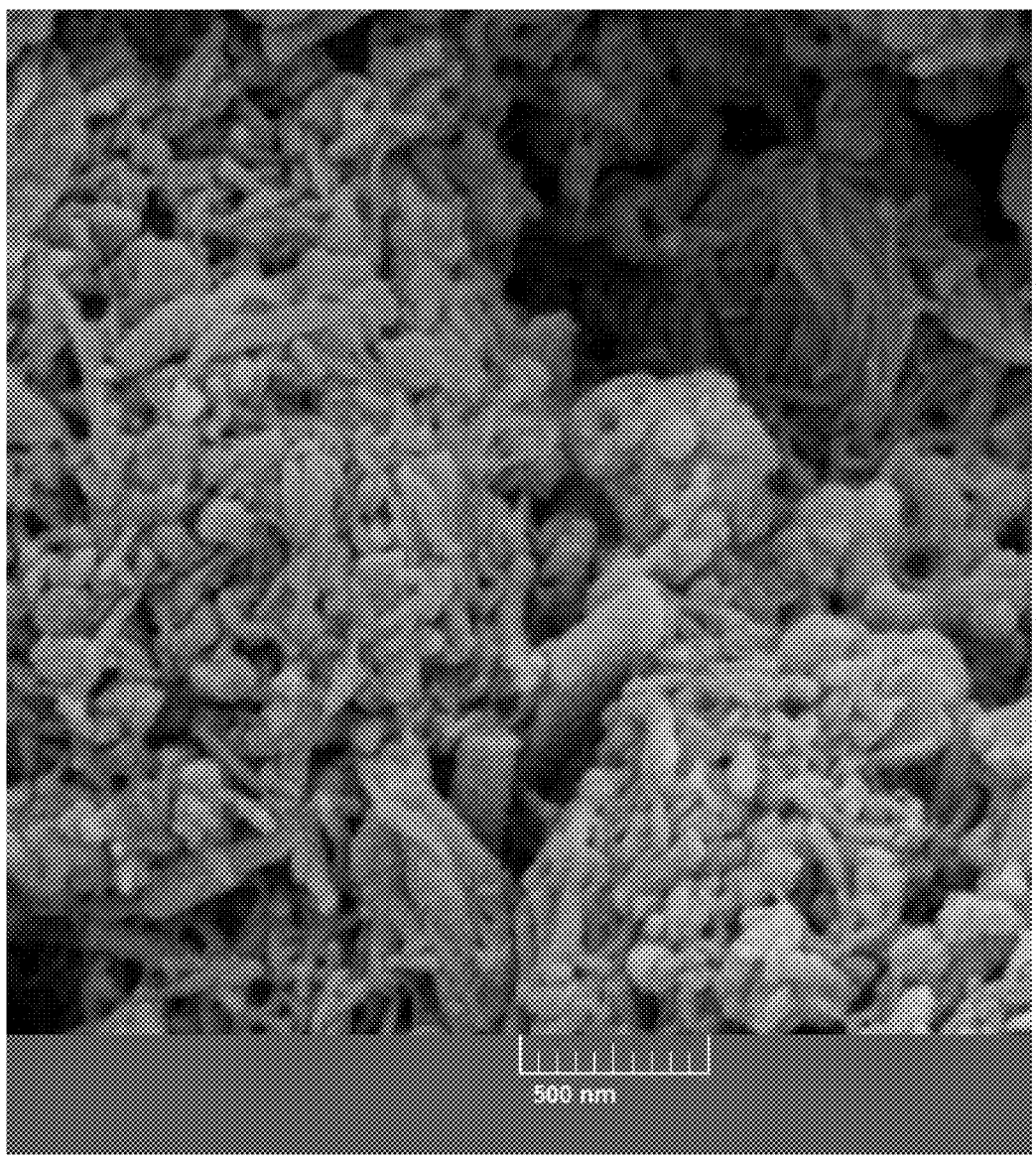

FIGS. 5A-5C are FE-SEM micrographs of polyaniline nanostructures prepared in the absence of ZnO nanoparticles and PVP, as described in connection with example 4. FIG. 5A is an FE-SEM micrograph of A-PANI, FIG. 5B is an FE-SEM micrograph of B-PANI, and FIG. 5C is an FE-SEM micrograph of C-PANI.

Figure 6A:
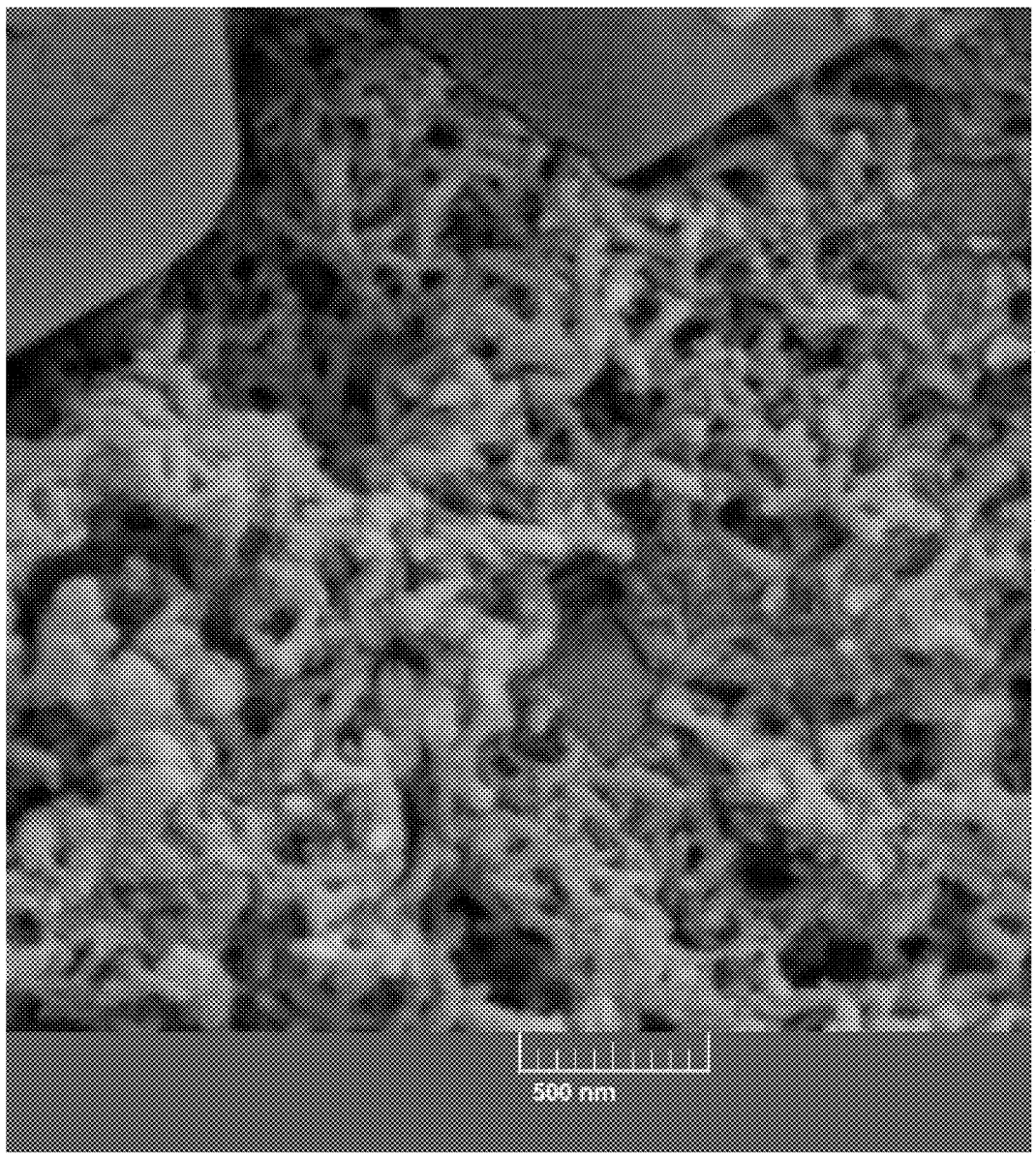
FIGS. 6A-6C are field emission scanning electron microscope (FE-SEM) micrographs of protonated polyaniline nanostructures of example 4, prepared as described in connection with example 5: AH-PANI (FIG. 6A); BH-PANI (FIG. 6B); and CH-PANI (FIG. 6C).
Figure 6B:
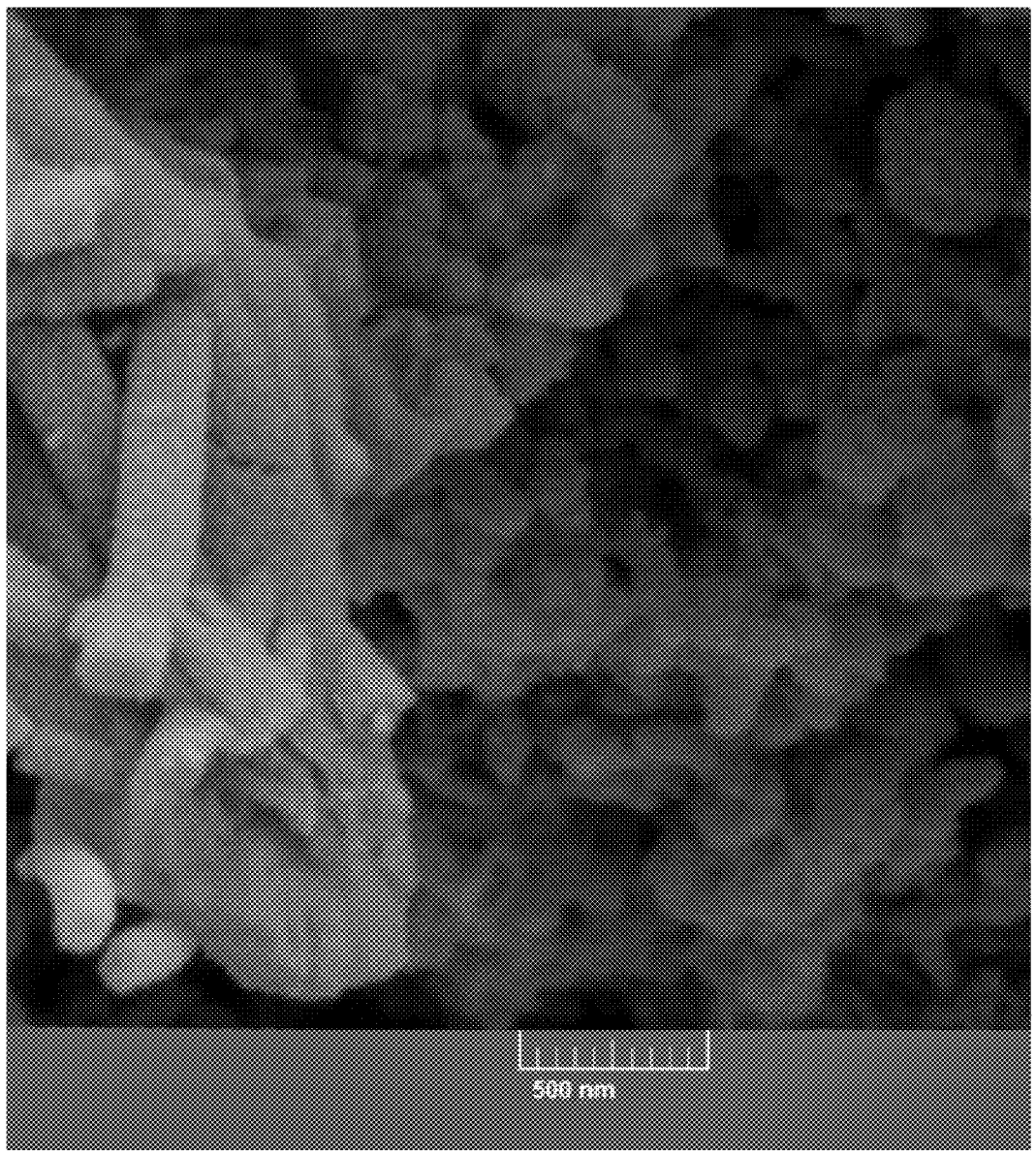
Figure 6C:
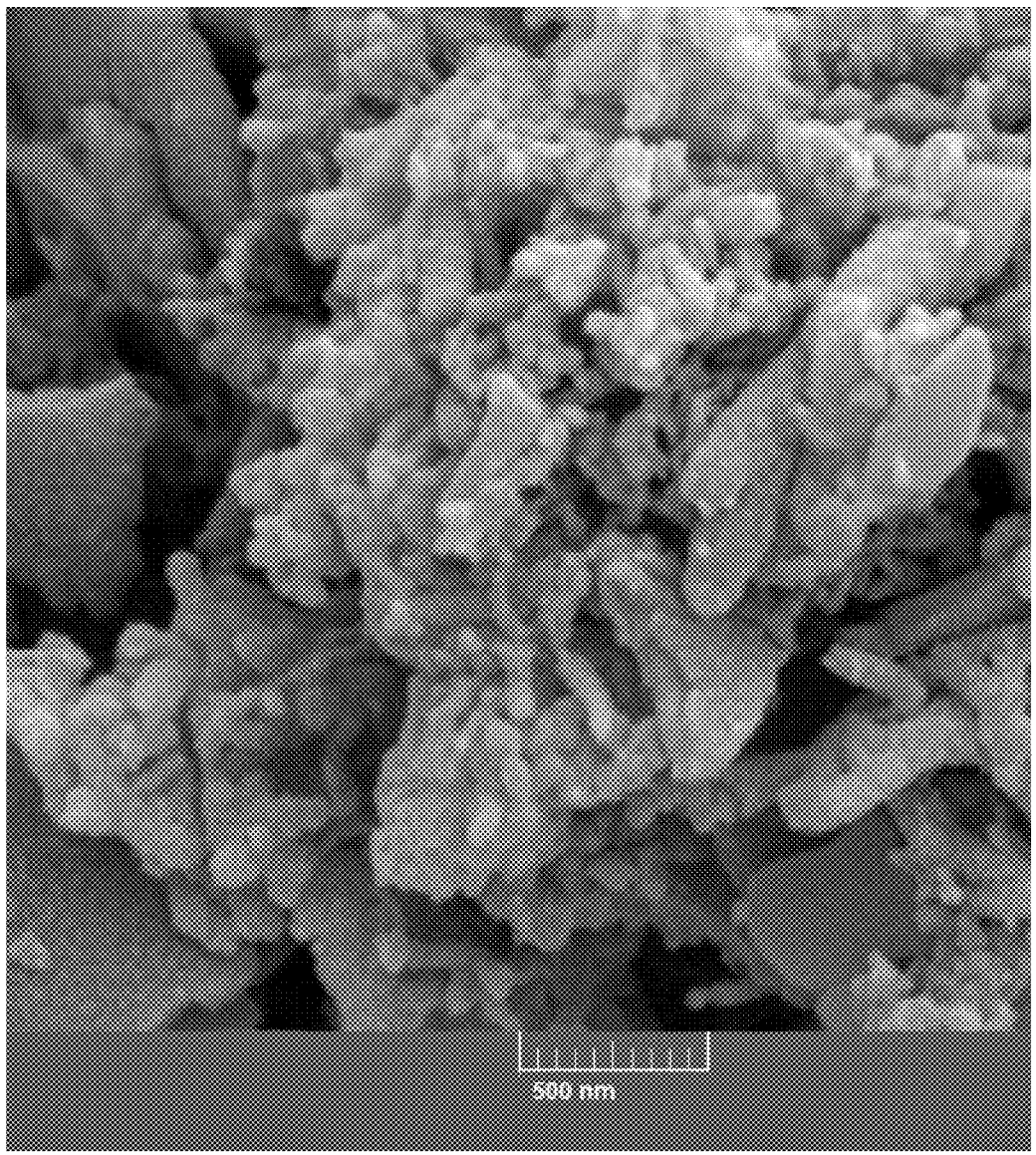

FIGS. 6A-6C are FE-SEM micrographs of protonated polyaniline samples prepared in the absence of ZnO nanoparticles and PVP, as described in connection with example 5. FIG. 6A is an FE-SEM micrograph of AH-PANI, FIG. 6B is an FE-SEM micrograph of BH-PANI, and FIG. 6C is an FE-SEM micrograph of CH-PANI.

Referring to FIGS. 5A-5C, nanoparticles together with nano-belts can be seen in the structure of these samples (i.e., A-PANI, B-PANI, and C-PANI). Referring to FIGS. 6A-6C, as illustrated, doping of these polyaniline samples by HF solution after synthesis (as described in example 5) is shown as causing production of non-homogenous structures containing nanoparticles and nanofibers together with the micrometric bulks. Therefore, without intending to be bound by any particular theory, the inventors believe that both the concentration of primary doping acid and the presence of ZnO nanoparticles and PVP can be effective in the production of homogenous and regular polyaniline nanostructures. In other words, and again without intending to be bound by any particular theory, the inventors believes the concentration of the primary dopant acid in the presence of ZnO and PVP determines—at least in significant part—the morphology of polyaniline nanostructures.

Figure 7A:
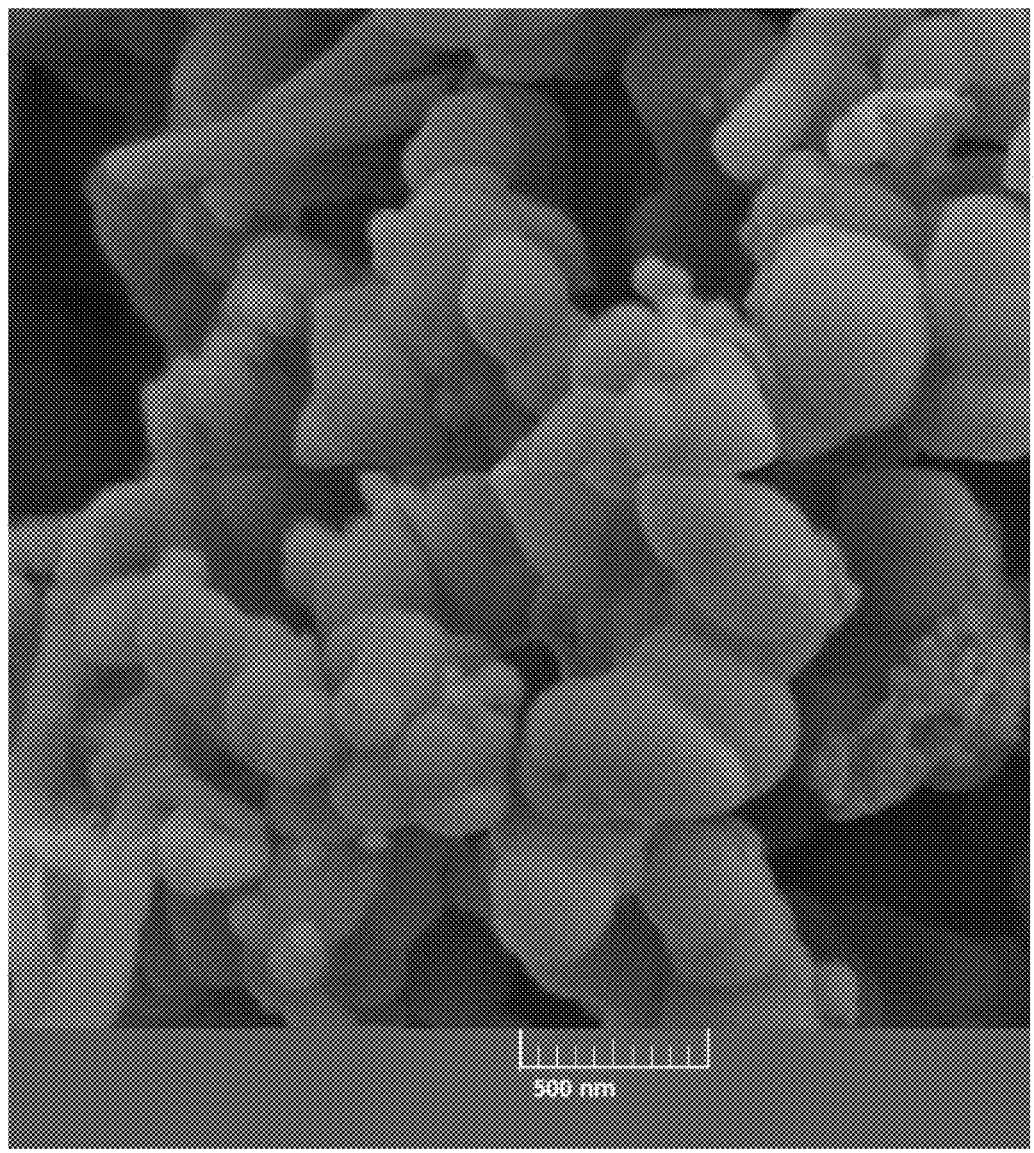
FIGS. 7A-7C are field emission scanning electron microscope (FE-SEM) micrographs of polyaniline nanostructures prepared as described in connection with example 2: ZA-PANI (FIG. 7A); ZB-PANI (FIG. 7B); and ZC-PANI (FIG. 7C).
Figure 7B:
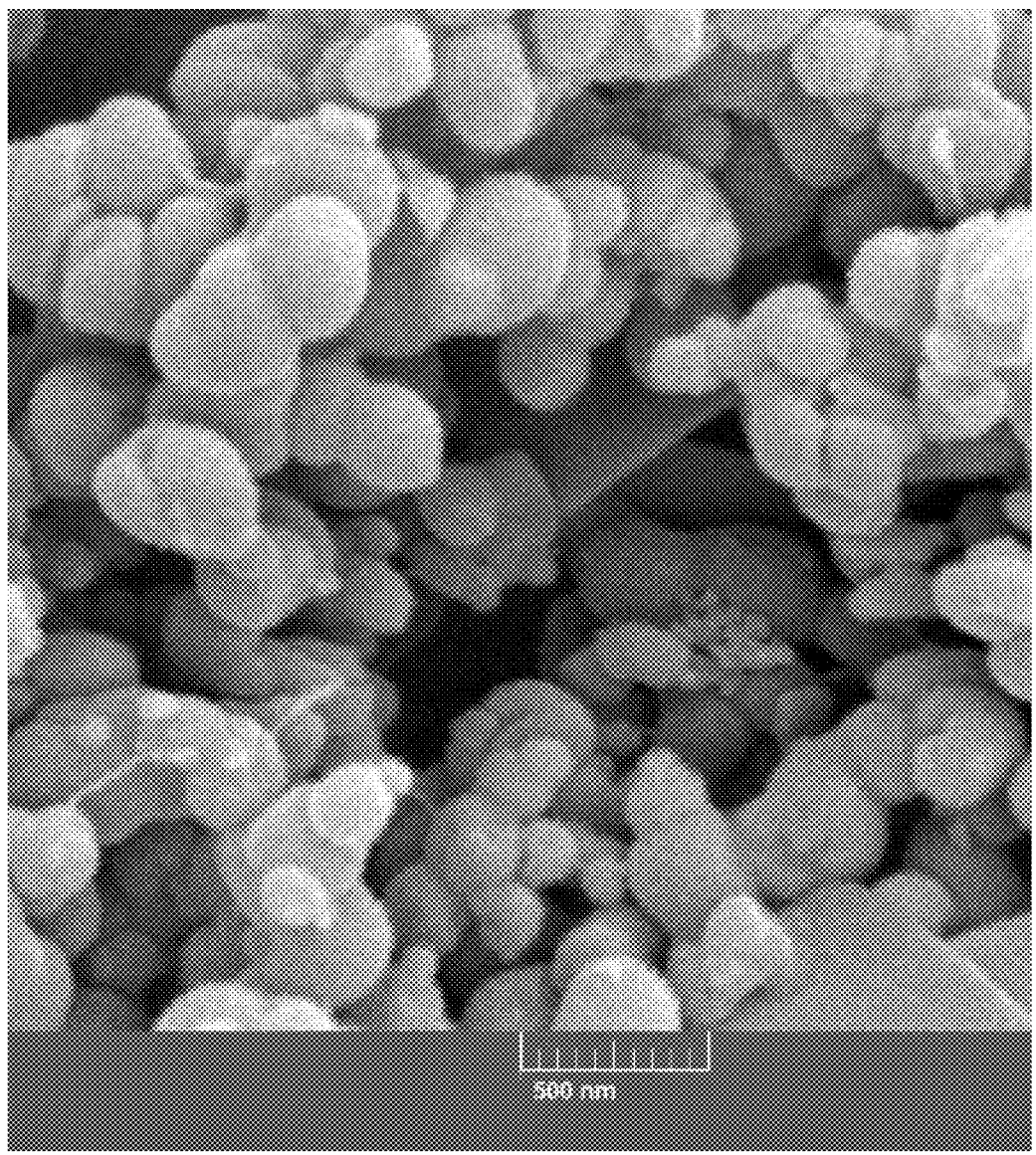
Figure 7C:
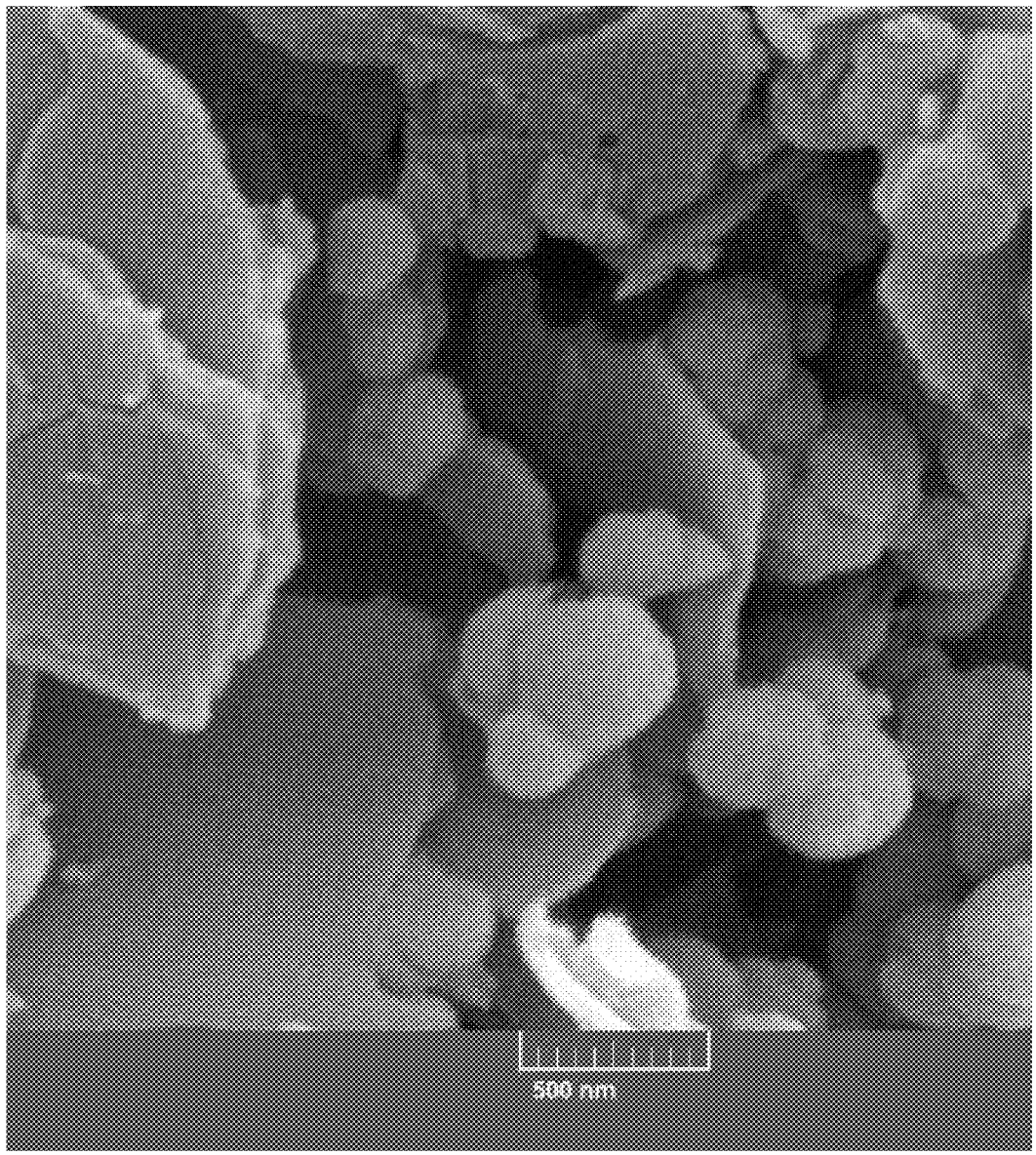
Figure 8A:
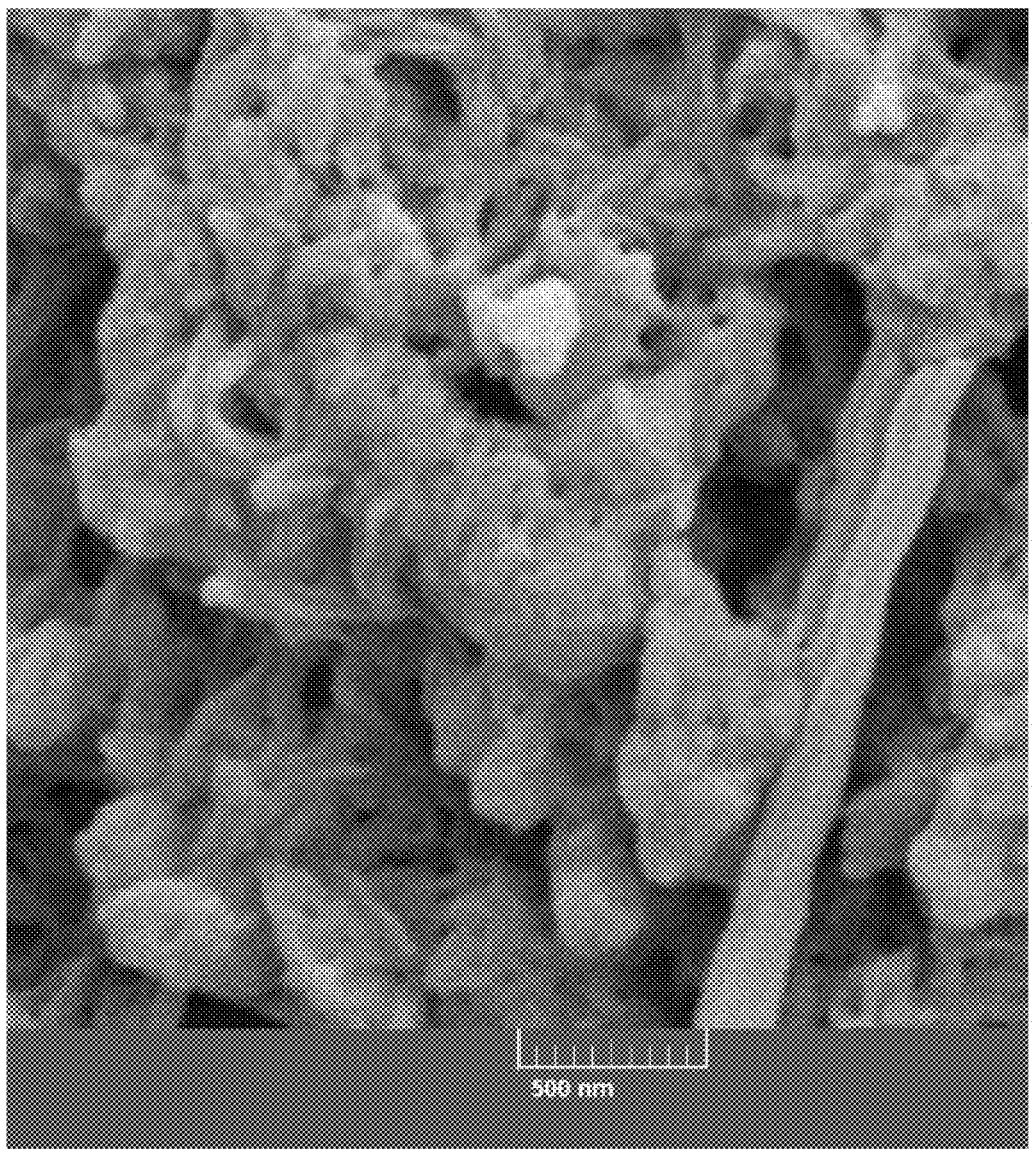
FIGS. 8A-8C are field emission scanning electron microscope (FE-SEM) micrographs of protonated polyaniline nanostructures of example 2, prepared as described in connection with example 5: ZAH-PANI (FIG. 8A); ZBH-PANI (FIG. 8B); and ZCH-PANI (FIG. 8C).
Figure 8B:
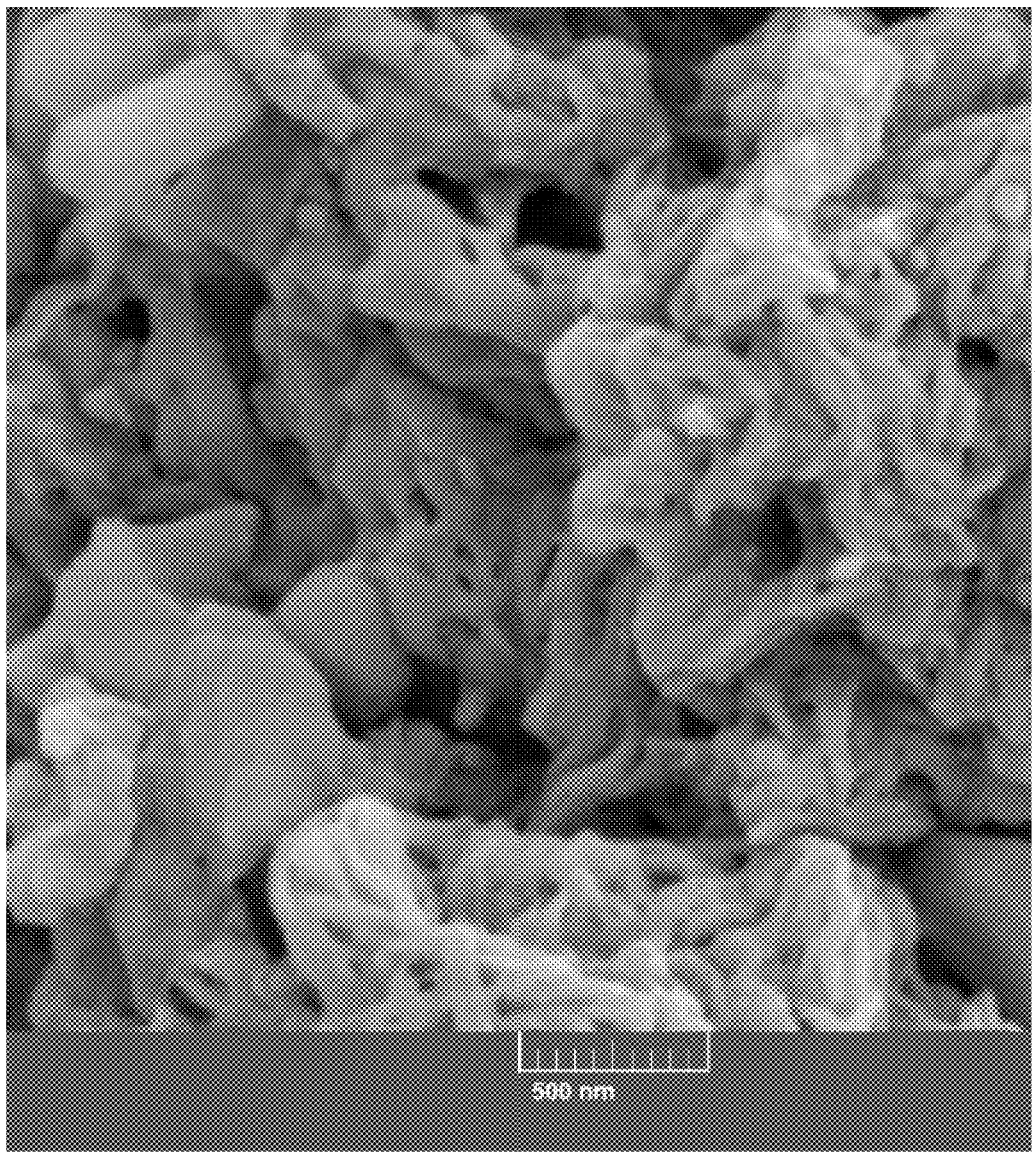
Figure 8C:
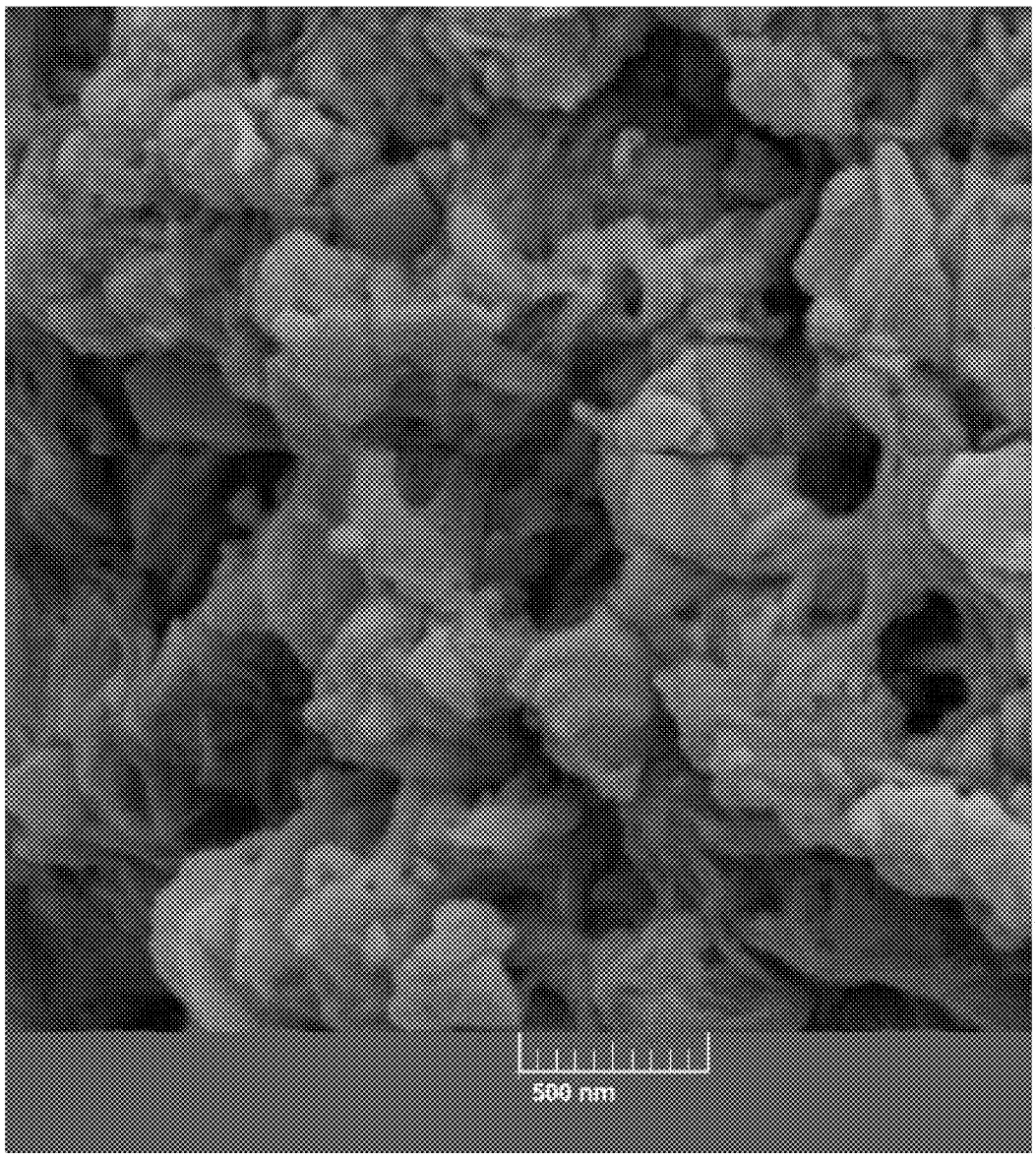

FIGS. 7A-7C are FE-SEM micrographs of polyaniline nanostructures prepared in the presence of ZnO nanoparticles as the templating compound and in the absence of PVP, synthesized as was described in connection with example 2. FIGS. 8A-8C are FE-SEM micrographs of protonated polyaniline samples prepared in the presence of ZnO nanoparticles as the templating compound and in the absence of PVP, synthesized as was described in connection with example 5.

Referring to FIGS. 7A-7C, in the presence of only zinc oxide nanoparticles as the hard templating compound, polyaniline particles with the average particle size of 250 nm are obtained. The size of polyaniline particles, prepared in the absence of zinc oxide nanoparticles (as shown in FIGS. 5A-5C), was smaller than that of particles prepared in the presence of zinc oxide nanoparticles (as shown in FIGS. 7A-7C). The presence of ZnO nanoparticles causes production of polyaniline particles with larger particle size. This may be due to the aggregation and growth of polyaniline chains around the ZnO nanoparticles followed by dissolution of ZnO nanoparticles in the acidic synthesis medium. Referring to FIGS. 8A-8C, when ZnO nanoparticles are utilized as the hard templating compound during synthesis of polyaniline, after secondary doping, regular structures are produced.

Figure 9A:
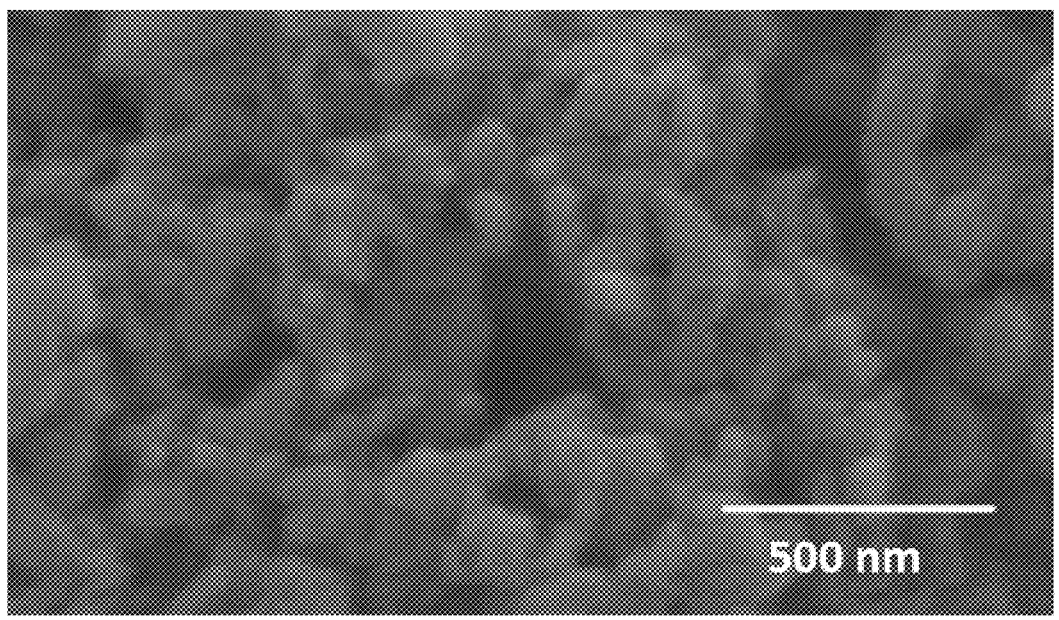
FIGS. 9A-9C are field emission scanning electron microscope (FE-SEM) micrographs of polyaniline nanostructures prepared as described in connection with example 3: PA-PANI (FIG. 9A); PB-PANI (FIG. 9B); and PC-PANI (FIG. 9C).
Figure 9B:
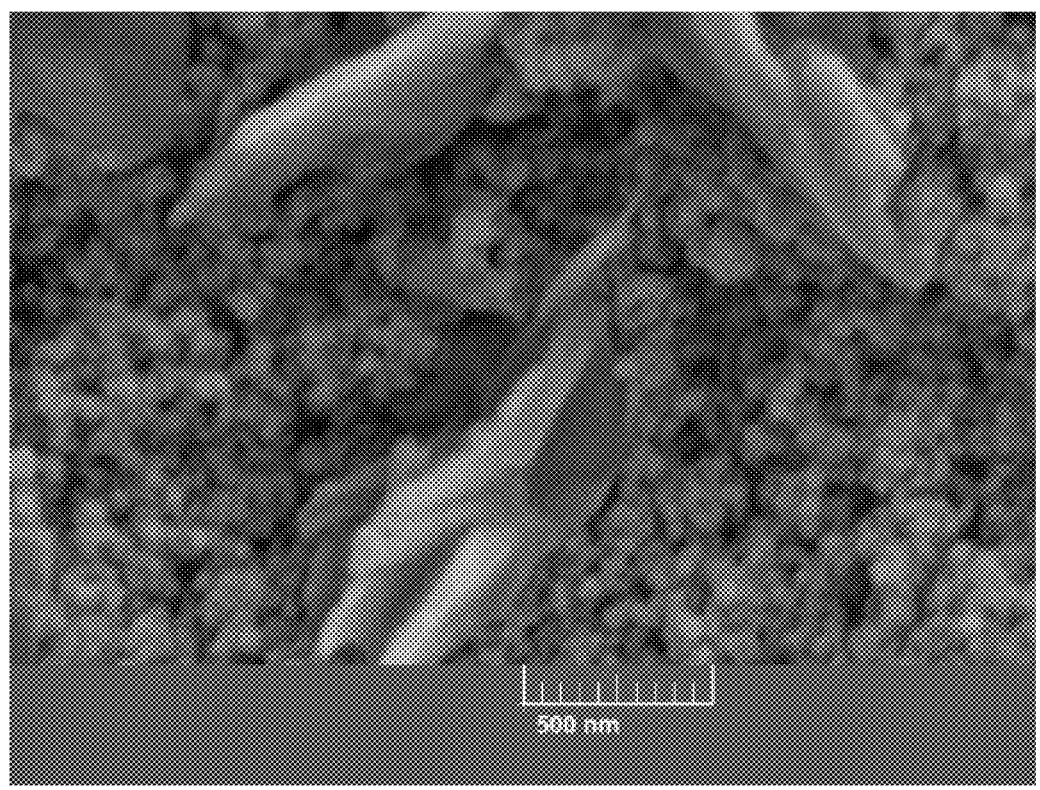
Figure 9C:
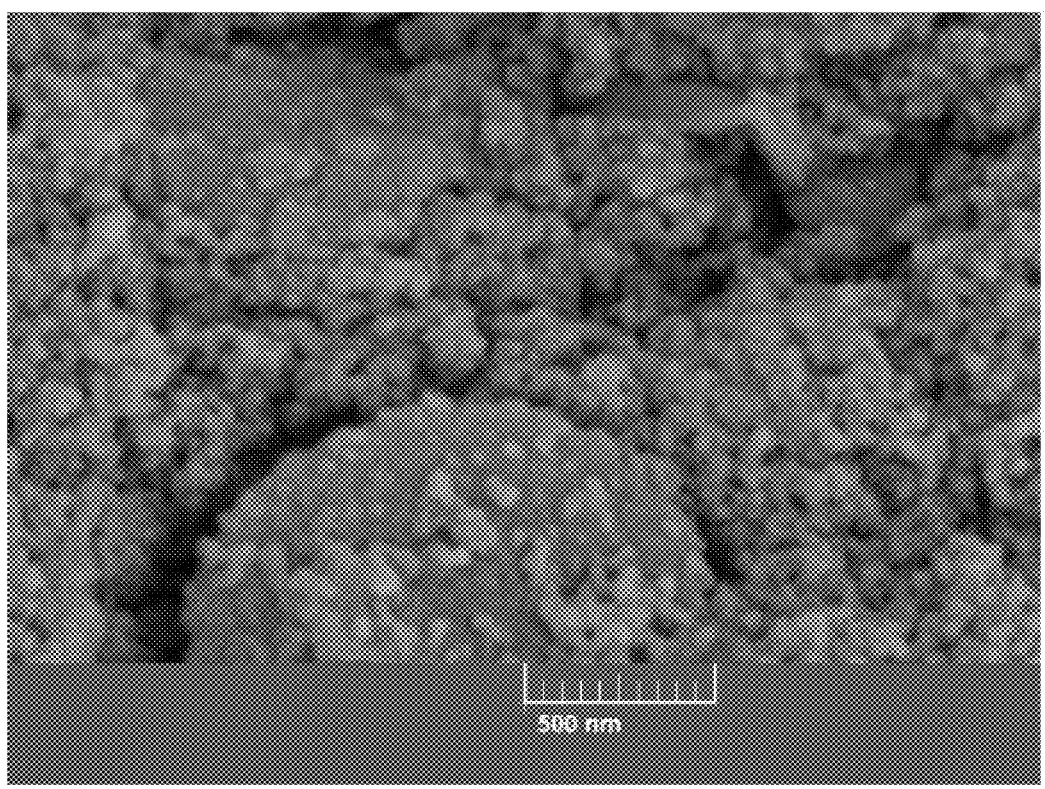
Figure 10A:
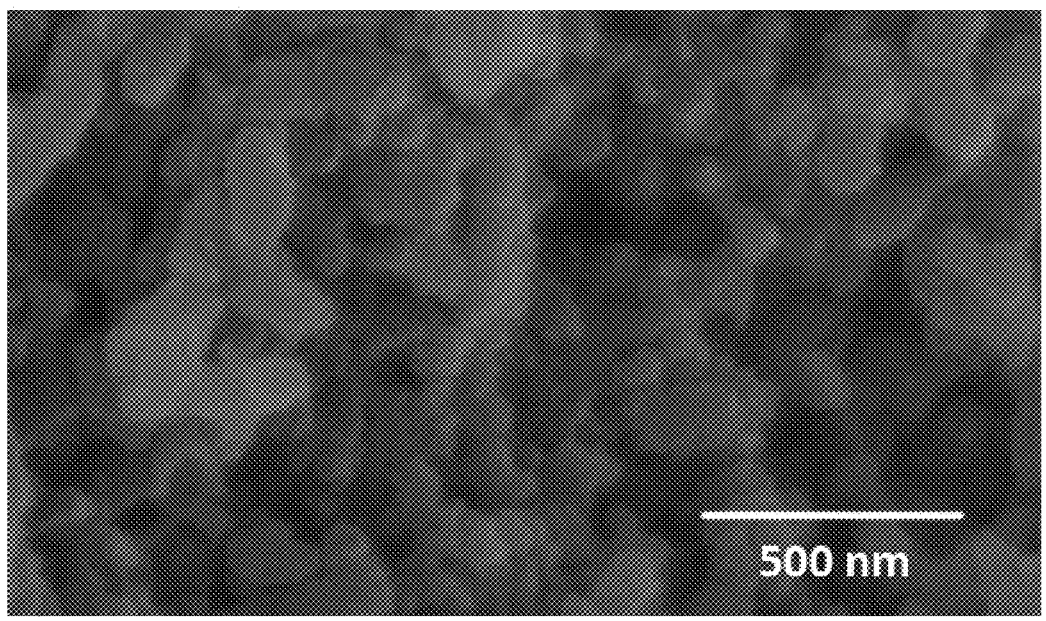
FIGS. 10A-10C are field emission scanning electron microscope (FE-SEM) micrographs of protonated polyaniline nanostructures of example 3, prepared as described in connection with example 5: PAH-PANI (FIG. 10A); PBH-PANI (FIG. 10B); and PCH-PANI (FIG. 10C).
Figure 10B:
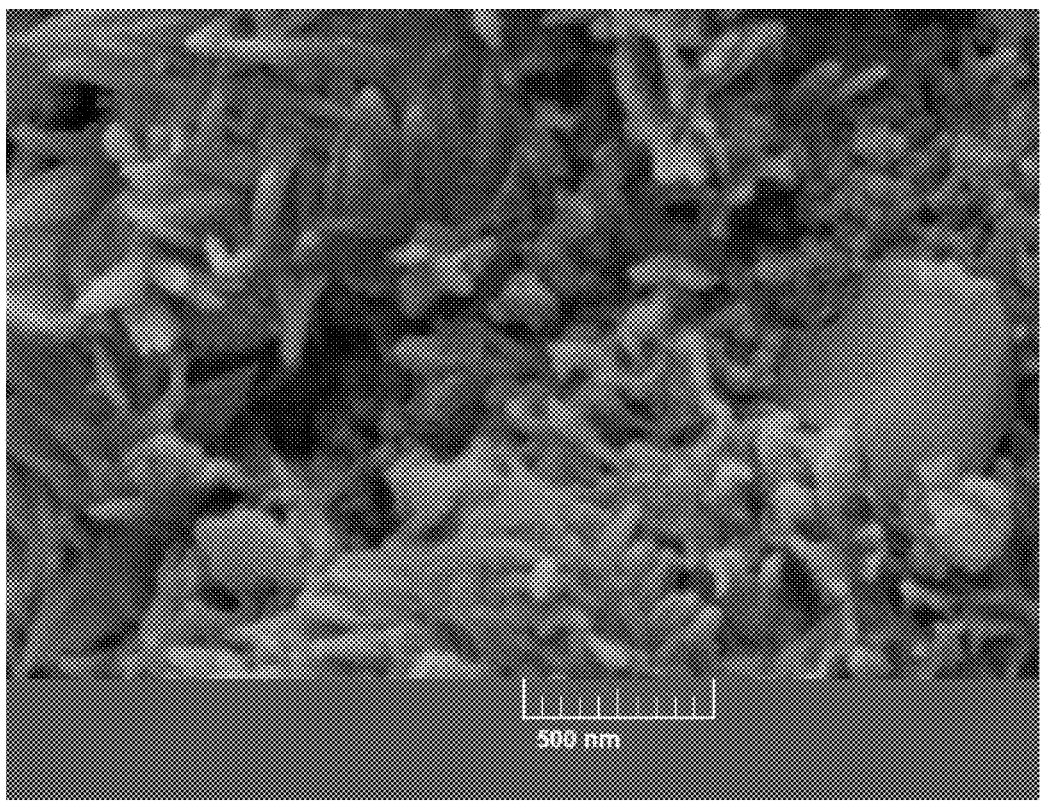
Figure 10C:
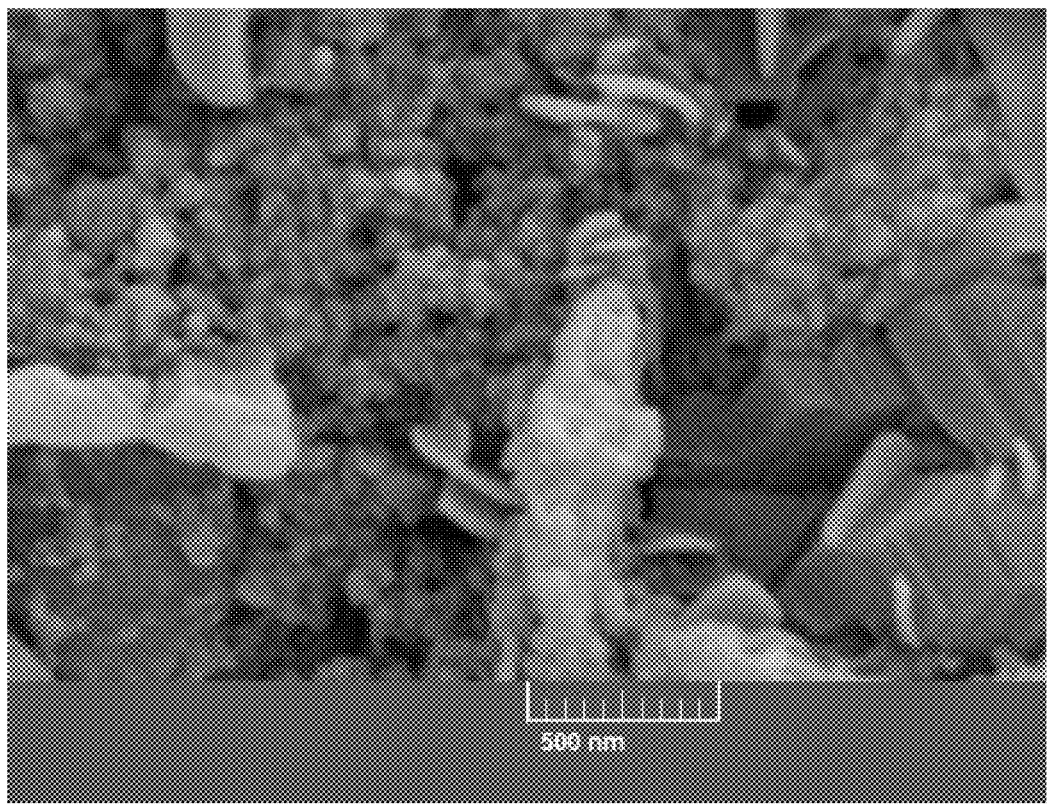

FIGS. 9A-9C are FE-SEM micrographs of polyaniline nanostructures prepared in the presence of PVP as the templating compound and in the absence of ZnO nanoparticles, synthesized as was described in connection with example 3. FIGS. 10A-10C are FE-SEM micrographs of protonated polyaniline samples prepared in the presence of PVP as the templating compound and in the absence of ZnO nanoparticles, synthesized as was described in connection with example 5.

Referring to FIG. 9A, in the presence of PVP in high concentration of dopant acid, the polyaniline nanoparticles with the average particle size of 50 nm are obtained. Referring to FIGS. 9B and 9C, decreasing acid concentration during synthesis leads to appearance of nano-plates as well as nanoparticles. In the presence of PVP as a soft template nano-scaled polyaniline is synthesized, however in the presence of ZnO nanoparticles as hard template micro-scaled polyaniline is obtained.

Referring to FIGS. 10A-10C, once the synthesized polyaniline samples are doped by hydrofluoric acid, polymer chains gain new structural forms. In this regard, different results are obtained by using different concentrations of the dopant acid during synthesis. In case of higher primary dopant acid concentrations, the secondary doping may lead to an increase in the size of particles. The inventors therefore believe that only the size of nanoparticles increases as a result of the secondary doping. In case of lower primary dopant acid concentrations, accumulated nanofibers and nano-plates are obtained respectively by decreasing the primary dopant acid concentration. Therefore, without intending to be bound by any particular theory, presence of PVP during synthesis appears to cause production of different nanostructures after secondary doping while the sole presence of zinc oxide nanoparticles did not show such effect. On the other hand, in the presence of zinc oxide nanoparticles followed by secondary doping, more homogenous and regular structures are obtained. Without intending to be bound by any particular theory, the inventors therefore believe that in the co-presence of ZnO nanoparticles as hard template and PVP as soft template, followed by secondary doping using hydrofluoric acid after synthesis, more regular and homogenous reformed nanostructure of polyaniline are obtained.

Example 8: Conductivity Measurements

In this example, conductivity of polyaniline samples synthesized as described in connection with example 1 and their protonated counterpart synthesized as described in connection with example 5, are utilized to determine the AC conductivity of polyaniline nanostructures.

Table 1 reports the conductivity of polyaniline nanostructures prepared as described in connection with examples 1 and 5. The conductivity of polyaniline nanostructures decreases with decreasing the concentration of primary dopant in samples ZPA-PANI to ZPC-PANI. The concentration of dopant can have an important role in the conductivity of conducting polymers. By decreasing the concentration of primary dopant, moving charges on the polymer chains can decrease and as a result, the conductivity of the polymer can decrease.

TABLE 1

Conductivity of the samples

| Sample name | Conductivity (S/cm) |
| --- | --- |
| ZPA-PANI | 0.0106 |
| ZPB-PANI | 0.000122 |
| ZPC-PANI | 0.0000413 |
| ZPAH-PANI | 1.4 |
| ZPBH-PANI | 0.1247 |
| ZPCH-PANI | 0.0955 |

Secondary doping can cause an increase in the conductivity of the samples, however, ZPAH-PANI shows the highest conductivity and ZPBH-PANI and ZPC-PANI show lower conductivities.

Depending on the morphology needed, the concentrations of the primary dopant and the secondary dopant can be changed in order to obtain the desired morphology in the synthesized polyaniline nanostructures.

What is claimed is:

1. A method for synthesizing polyaniline nanostructures, comprising:
   subjecting aniline monomers to a chemical oxidative polymerization in presence of a templating compound and a primary dopant, to obtain polyaniline nanostructures with a first morphology; and
   doping the obtained polyaniline nanostructures with a secondary dopant to obtain polyaniline nanostructures with a second morphology,
   wherein the templating compound is polyvinylpyrrolidone (PVP) adsorbed on the surface of ZnO nanoparticles.

2. The method according to claim 1, wherein the secondary dopant is in the group consisting of HF, HCl, $H_2SO_4$, $HNO_3$, $H_2C_2O_4$, $HClO_4$, $HClO_3$, $H_3PO_4$, HI, HBr, citric acid, salicylic acid, sulfonic acids, carboxylic acids, and mixtures thereof.

3. The method according to claim 1, wherein the secondary dopant is HF.

4. The method according to claim 1, wherein the secondary dopant is HF with a concentration between about 0.0001 M and about 1M.

5. The method according to claim 1, wherein the secondary dopant has a concentration between about 0.0001 M and about 1M.

6. The method according to claim 1, wherein doping the obtained polyaniline nanostructures with a secondary dopant comprises dispersing the obtained polyaniline nanostructures in a solution of the secondary dopant.

7. The method according to claim 1, wherein the chemical oxidative polymerization comprises:
   preparing an aniline hydrochloride solution;
   mixing the templating compound with the aniline hydrochloride solution to obtain a first mixture;
   adding a solution containing an oxidant and the primary dopant to the first mixture to obtain a second mixture; and leaving the second mixture for the chemical oxidative polymerization to occur during a polymerization period.

* * * * *